(12) United States Patent
Naito et al.

(10) Patent No.: US 8,882,184 B2
(45) Date of Patent: Nov. 11, 2014

(54) STRUCTURE FOR FRONT PORTION OF AUTOMOBILE BODY

(75) Inventors: Tadashi Naito, Wako (JP); Yutaka Kanaguchi, Wako (JP); Yoshikatsu Ohta, Wako (JP); Youichirou Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/985,112

(22) PCT Filed: Jan. 27, 2012

(86) PCT No.: PCT/JP2012/051806
§ 371 (c)(1),
(2), (4) Date: Oct. 21, 2013

(87) PCT Pub. No.: WO2012/114824
PCT Pub. Date: Aug. 30, 2012

(65) Prior Publication Data
US 2014/0035325 A1    Feb. 6, 2014

(30) Foreign Application Priority Data

Feb. 23, 2011  (JP) ................................. 2011-036775
Feb. 23, 2011  (JP) ................................. 2011-036776
Feb. 23, 2011  (JP) ................................. 2011-036777

(51) Int. Cl.
*B60K 37/00* (2006.01)
*B62D 25/08* (2006.01)

(52) U.S. Cl.
CPC ............ *B62D 25/085* (2013.01); *B62D 25/082* (2013.01)
USPC .................................................. 296/203.02

(58) Field of Classification Search
CPC ................. B60K 13/02; B62D 25/025; F02M 35/10013; F02M 35/161; B60P 3/20; B64D 11/06; B60N 2002/0264; B60N 2/0232; B60N 2/34
USPC .................. 296/203.02, 187.09, 193.09, 204; 410/129
See application file for complete search history.

(56) References Cited

U.S. PATENT DOCUMENTS 4,046,415 A * 9/1977 Klees et al. .................. 296/35.1
4,440,435 A * 4/1984 Norlin ...................... 296/187.09
(Continued)

FOREIGN PATENT DOCUMENTS

JP    H03-37082 U    4/1991
JP    H04-365678 A   12/1992
(Continued)

*Primary Examiner* — Kiran B Patel
(74) *Attorney, Agent, or Firm* — Carrier Blackman & Associates, P.C.; William D. Blackman; Joseph P. Carrier

(57) ABSTRACT

A structure for a front portion of an automobile body includes a bulkhead side, which is joined to a front portion of a front side frame extending in the fore-and-aft direction extends in the vertical direction, and a side frame gusset, which provides a connection between the front portions of the front side frame and a wheel house upper member. The bulkhead side and the side frame gusset are joined by a linking panel having a right-angled triangle shape when viewed from the front within a plane perpendicular to an axis in the fore-and-aft direction. When a load is applied for relatively moving the front side frame, the side frame gusset and the wheel house upper member supporting the load by a shear force of the linking panel disposed within the plane enhance the rigidity of a front portion of a vehicle body and minimize any increase in weight.

24 Claims, 16 Drawing Sheets

(56) References Cited

U.S. PATENT DOCUMENTS

| | | | |
|---|---|---|---|
| 4,750,780 A * | 6/1988 | Harasaki et al. | 296/192 |
| 4,938,526 A * | 7/1990 | Sannomiya et al. | 296/192 |
| 4,950,025 A * | 8/1990 | Yoshii | 296/203.04 |
| 5,303,973 A | 4/1994 | Fujii | |
| 6,139,092 A * | 10/2000 | Doner et al. | 296/187.09 |
| 6,364,358 B1 * | 4/2002 | Miller | 280/784 |
| 6,908,146 B2 * | 6/2005 | Tomita | 296/203.02 |
| 7,416,242 B2 * | 8/2008 | Godfrey et al. | 296/187.08 |
| 7,461,890 B2 * | 12/2008 | Yatsuda | 296/203.02 |
| 7,695,008 B2 | 4/2010 | Kuze et al. | |
| 8,141,937 B2 * | 3/2012 | Tsuyuzaki et al. | 296/187.12 |
| 8,151,921 B2 * | 4/2012 | Okabe et al. | 180/68.4 |
| 8,256,831 B2 | 9/2012 | Abe et al. | |
| 8,276,976 B2 * | 10/2012 | Yasuhara et al. | 296/187.09 |
| 8,419,116 B2 * | 4/2013 | Boettcher et al. | 296/203.02 |
| 8,459,728 B2 * | 6/2013 | Fujii et al. | 296/203.02 |
| 8,496,287 B2 * | 7/2013 | Matsuura et al. | 296/187.09 |
| 8,561,741 B2 * | 10/2013 | Kurokawa et al. | 180/68.4 |
| 8,662,566 B1 * | 3/2014 | Edwards et al. | 296/187.09 |
| 8,720,983 B1 * | 5/2014 | Edwards et al. | 296/203.02 |
| 8,764,096 B2 * | 7/2014 | Han et al. | 296/133 |
| 8,764,104 B2 * | 7/2014 | Kihara et al. | 296/193.09 |
| 2005/0077711 A1 * | 4/2005 | Yasui et al. | 280/735 |
| 2005/0088015 A1 * | 4/2005 | Kishikawa et al. | 296/193.09 |
| 2007/0176443 A1 * | 8/2007 | Yasuhara et al. | 293/133 |
| 2009/0085373 A1 * | 4/2009 | Terada et al. | 296/187.09 |
| 2009/0096253 A1 * | 4/2009 | Yatsuda | 296/193.09 |
| 2011/0062750 A1 * | 3/2011 | Nakaura et al. | 296/187.09 |
| 2013/0140852 A1 * | 6/2013 | Takeda et al. | 296/203.02 |
| 2013/0270860 A1 * | 10/2013 | Young et al. | 296/187.09 |
| 2013/0334840 A1 * | 12/2013 | Iseki et al. | 296/193.09 |
| 2014/0152051 A1 * | 6/2014 | Saitou et al. | 296/187.09 |

FOREIGN PATENT DOCUMENTS

| | | |
|---|---|---|
| JP | 2006-062542 A | 3/2006 |
| JP | 2007-216760 A | 8/2007 |
| JP | 2007-296885 A | 11/2007 |
| JP | 2008-195094 A | 8/2008 |
| JP | 2010-023792 A | 2/2010 |
| JP | 2010-083448 A | 4/2010 |

* cited by examiner

FIG.15
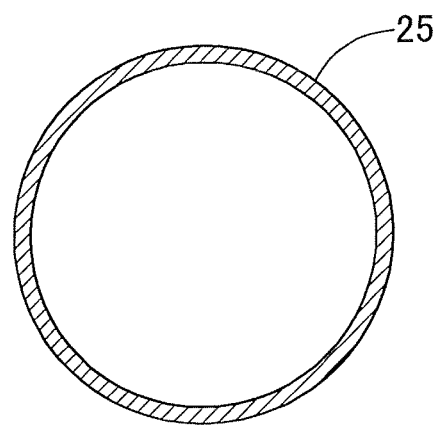
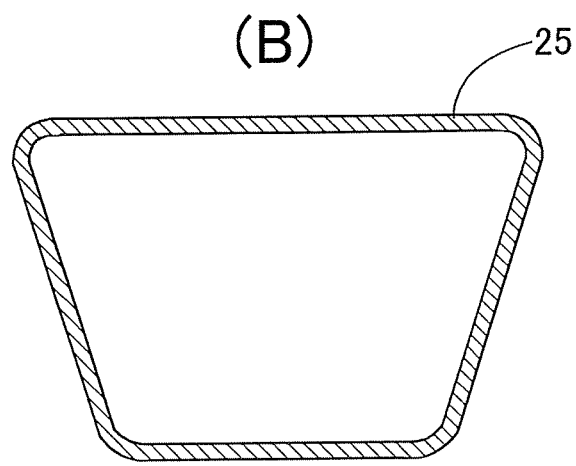

STRUCTURE FOR FRONT PORTION OF AUTOMOBILE BODY

TECHNICAL FIELD

The present invention relates to a structure for a front portion of an automobile body that enhances vehicle body rigidity by strongly joining a front portion of a front side frame and a front portion of a wheel house upper member by means of a lightweight structure.

BACKGROUND ART

An arrangement in which a joining structure for integrally joining a front portion of a front side frame and a front portion of a wheel house upper member is formed from a front leg portion extending downwardly from the front side frame toward a subframe, a horizontal linking portion extending outwardly in the vehicle width direction from the front side frame toward the wheel house upper member, and an inclined linking portion having a right-angled triangle shape when viewed from the front and being connected to an outer face in the vehicle width direction of the front leg portion and a lower face of the horizontal linking portion is known from Patent Document 1 below.

Patent Document 1: Japanese Patent No. 4233053

DISCLOSURE OF INVENTION

Problems to be Solved by the Invention

In the above-mentioned conventional arrangement, since the inclined linking portion, which has a right-angled triangle shape when viewed from the front, is not only a large-sized member whose horizontal cross-section is formed into a squared U-shape and is heavy, but also is linked to the front leg portion, the horizontal linking portion, or the wheel house upper member via a plane B (a plane perpendicular to an axis in the left-and-right direction) or a plane H (a plane perpendicular to an axis in the vertical direction), when the front side frame and the wheel house upper member are displaced relative to each other in the left-and-right direction or the vertical direction and a load within a plane T (a plane perpendicular to an axis in the fore-and-aft direction) is applied to the inclined linking portion, it is difficult to efficiently transmit the load, and there is the problem that the rigidity cannot be enhanced in proportion to the heavy weight.

The present invention has been accomplished in light of the above circumstances, and it is an object thereof to enhance the rigidity of a front portion of an automobile body while minimizing any increase in weight.

Means for Solving the Problems

In order to attain the above object, according to a first aspect of the present invention, there is provided a structure for a front portion of an automobile body, comprising a front side frame that extends in a fore-and-aft direction, a vertical member that is joined to a front portion of the front side frame and extends in a vertical direction, a wheel house upper member that extends downwardly and toward the front from a front end of a front pillar outside the front side frame in the vehicle width direction, a side frame gusset that provides a connection between a front portion of the front side frame and a front portion of the wheel house upper member, and a linking panel that joins the vertical member and the side frame gusset within a plane T.

Further, according to a second aspect of the present invention, in addition to the first aspect, the linking panel is a member having a right-angled triangle shape when viewed from the front and comprises a horizontal edge portion, a vertical edge portion and an inclined edge portion, the vertical edge portion being joined to the vertical member beneath the front side frame within the plane T, and the horizontal edge portion being joined to the side frame gusset within the plane T.

Furthermore, according to a third aspect of the present invention, in addition to the second aspect, the linking panel is joined to the front portion of the wheel house upper member within the plane T at an apex where the horizontal edge portion and the inclined edge portion are merged together.

Moreover, according to a fourth aspect of the present invention, in addition to the second or third aspect, the horizontal edge portion of the linking panel is formed integrally with a front face of the side frame gusset.

Further, according to a fifth aspect of the present invention, in addition to any one of the first to fourth aspects, the vertical edge portion of the linking panel is formed integrally with a front face or a rear face of the vertical member.

Furthermore, according to a sixth aspect of the present invention, in addition to the first aspect, a front bulkhead that is formed into a rectangular shape while comprising a bulkhead upper extending in the vehicle width direction, a bulkhead lower extending in the vehicle width direction, and a left and right pair of the vertical members extending in the vertical direction is supported between front portions of a pair of left and right front side frames, a pair of left and right corner members linking the bulkhead upper and the vertical member are formed integrally from a bent hollow steel tube, the vertical member is molded by hydroforming or press forming so as to form a recess in an outer face in the vehicle width direction, and an inner face in the vehicle width direction of the front side frame is joined to the recess.

Moreover, according to a seventh aspect of the present invention, in addition to the sixth aspect, the outer face in the vehicle width direction of the vertical member and an upper face or a lower face of the front side frame are linked via a reinforcing member.

Further, according to an eighth aspect of the present invention, in addition to the seventh aspect, the reinforcing member is formed so as to have a squared U-shaped cross-section while comprising a front wall portion, a side wall portion and a rear wall portion, the rear wall portion jutting out further inward in the vehicle width direction than the front wall portion.

Furthermore, according to a ninth aspect of the present invention, in addition to any one of the sixth to eighth aspects, the vertical member and the bulkhead lower are linked via a first reinforcing plate disposed on the same plane as the linking panel.

Moreover, according to a tenth aspect of the present invention, in addition to any one of the sixth to ninth aspects, the corner member is reinforced by a second reinforcing plate (29).

Moreover, according to an eleventh aspect of the present invention, in addition to the first aspect, a front bulkhead formed into a frame shape is disposed between front portions of a pair of left and right front side frames, the front bulkhead is fixed to the front side frame via a reinforcing member, and the reinforcing member comprises a side wall portion that provides a connection as a continuous face between an outer face in the vehicle width direction of the front bulkhead and an outer face in the vehicle width direction of the front side frame.

Further, according to a twelfth aspect of the present invention, in addition to the first aspect, the reinforcing member further comprises a front wall portion that extends from the front edge of the side wall portion inwardly in the vehicle width direction and is connected to a front face or the outer face in the vehicle width direction of the front bulkhead, and a rear wall portion that extends from the rear edge of the side wall portion inwardly in the vehicle width direction and is connected to a rear face or an outer face in the vehicle width direction of the front bulkhead, and is formed into a squared U-shape with the horizontal cross-section opening inwardly in the vehicle width direction.

Furthermore, according to a thirteenth aspect of the present invention, in addition to the twelfth aspect, the rear wall portion juts out further inward in the vehicle width direction than the front wall portion.

Moreover, according to a fourteenth aspect of the present invention, in addition to any one of the eleventh to thirteenth aspects, the reinforcing member is provided on both an upper side and a lower side of the front side frame.

Further, according to a fifteenth aspect of the present invention, in addition to any one of the eleventh to fourteenth aspects, the front bulkhead comprises a bulkhead upper that extends in the vehicle width direction, a left and right pair of the vertical members that extend in the vertical direction, and a pair of left and right curved corner members that provide a connection between the bulkhead upper and the vertical member, the bulkhead upper and the corner member being formed so as to have a closed cross-section, and the vertical member being formed so as to have a closed cross-section or an open cross-section and, when the vertical member is formed so as to have an open cross-section, being joined to the front side frame or the reinforcing member so as to form a closed cross-section.

A front pillar upper 13 of an embodiment corresponds to the front pillar of the present invention, a bulkhead side 24 and a subframe support bracket 32 of the embodiment correspond to the vertical member of the present invention, a reinforcing plate 28 of the embodiment corresponds to the first reinforcing plate of the present invention, and a reinforcing plate 29 of the embodiment corresponds to the second reinforcing plate of the present invention.

Effects of the Invention

In accordance with the first aspect of the present invention, since the vertical member, which is joined to the front portion of the front side frame extending in the fore-and-aft direction and extends in the vertical direction, and the side frame gusset, which provides a connection between the front portion of the front side frame and the front portion of the wheel house upper member, are joined by means of the linking panel within the plane T perpendicular to the axis in the fore-and-aft direction, when a load is applied so as to relatively move the front portion of the front side frame, the side frame gusset, and the front portion of the wheel house upper member in the vertical direction or the left-and-right direction, supporting the load by means of the shear force of the linking panel disposed within the plane T enables the rigidity of the front portion of the vehicle body to be enhanced while minimizing any increase in the weight.

Furthermore, in accordance with the second aspect of the present invention, since the linking panel is a member having a right-angled triangle shape when viewed from the front and having the horizontal edge portion, the vertical edge portion, and the inclined edge portion, and the horizontal edge portion of the linking panel is joined to the side frame gusset within the plane T, it is possible to prevent the linking panel from bending, thus further enhancing the rigidity of the front portion of the vehicle body.

Moreover, in accordance with the third aspect of the present invention, since the linking panel is joined to the front portion of the wheel house upper member within the plane T via the apex at which the horizontal edge portion and the inclined edge portion are merged together, it becomes more difficult for the front portion of the wheel house upper member to be displaced relative to the front side frame and the vertical member, thus further enhancing the rigidity of the front portion of the vehicle body.

Furthermore, in accordance with the fourth aspect of the present invention, since the horizontal edge portion of the linking panel is formed integrally with the front face of the side frame gusset, it becomes possible to reduce the number of components and the number of welding steps and reduce the weight.

Furthermore, in accordance with the fifth aspect of the present invention, since the vertical edge portion of the linking panel is formed integrally with the front face or the rear face of the vertical member, it becomes possible to reduce the number of components and the number of welding steps and reduce the weight.

Moreover, in accordance with the sixth aspect of the present invention, the front bulkhead supported between the front portions of the pair of left and right front side frames is formed into a rectangular shape while having the bulkhead upper extending in the vehicle width direction, the bulkhead lower extending in the vehicle width direction, and the pair of left and right vertical members extending in the vertical direction. Since the pair of left and right corner members linking the bulkhead upper and the vertical members are formed as units from a bent hollow steel tube, it is possible to enhance the rigidity of the entire front bulkhead by increasing the rigidity of a corner part where the bulkhead upper and the vertical member are joined. Furthermore, due to the bent shape of the corner member it is possible to smoothly transmit a load from the vertical member to the bulkhead upper while the vehicle is traveling. Moreover, since the vertical member is molded by hydroforming or press forming to form the recess in the outer face in the vehicle width direction, and the inner face in the vehicle width direction of the front side frame is joined to the recess, it is possible to make the virtual axis of the vertical member closer to the axis of the front side frame by an amount corresponding to the depth of the recess and to carry out transmission of a load between the front side frame and the vertical member smoothly, thereby enhancing the rigidity of the front portion of the vehicle body.

Moreover, in accordance with the seventh aspect of the present invention, since the outer face in the vehicle width direction of the vertical member and the upper face or lower face of the front side frame are linked via the reinforcing member, not only can a part where the vertical member and the front side frame are joined be reinforced by means of the reinforcing member, but it is also possible to move the virtual axis of the vertical member toward the front side frame side by means of the reinforcing member, thus making the virtual axis of the vertical member closer to the axis of the front side frame and thereby enabling transmission of a load between the front side frame and the vertical member to be carried out more smoothly.

Furthermore, in accordance with the eighth aspect of the present invention, since the reinforcing member is formed so as to have a squared U-shaped cross-section while having the front wall portion, the side wall portion, and the rear wall portion, and the rear wall portion juts out further inwardly in the vehicle width direction than the front wall portion, when the preassembled front bulkhead is assembled on the front side frame by inserting it from the front side of the vehicle body, positioning the vertical member so that it abuts against the rear wall portion of the reinforcing member enables the ease of assembly of the front bulkhead to be enhanced.

Moreover, in accordance with the ninth aspect of the present invention, since the vertical member and the bulkhead lower are linked via the first reinforcing plate disposed on the same plane as the linking panel, not only is it possible to enhance the rigidity of the front bulkhead by means of the first reinforcing plate, but it is also possible to further enhance the rigidity of the front portion of the vehicle body by transmitting the load from the front side frame or the wheel house upper member to the bulkhead lower via the first reinforcing plate.

Furthermore, in accordance with the tenth aspect of the present invention, since the corner member is reinforced by means of the second reinforcing plate, it is possible to further enhance the rigidity of the front bulkhead.

Moreover, in accordance with the eleventh aspect of the present invention, since the reinforcing member fixing to the front side frame the frame-shaped front bulkhead disposed between the front portions of the pair of left and right front side frames includes the side wall portion, which connects the outer face in the vehicle width direction of the front bulkhead and the outer face in the vehicle width direction of the front side frame as a continuous face, it is possible, while enabling the front bulkhead and the front side frame to be easily assembled without particularly enhancing the dimensional precision of the two, to strongly join the two while minimizing the load transmission loss and the load transmission distance therebetween. Moreover, making the virtual axis of the front bulkhead move toward the front side frame by means of the reinforcing member enables the virtual axis to be made closer to the axis of the front side frame, transmission of a load between the front side frame and the front bulkhead to be carried out smoothly, and the rigidity of the front portion of the vehicle body to be enhanced.

Furthermore, in accordance with the twelfth aspect of the present invention, since the reinforcing member is formed so as to have a horizontal cross-section with a squared U-shape opening inwardly in the vehicle width direction while including the front wall portion, which extends from the front edge of the side wall portion inwardly in the vehicle width direction and is connected to the front face or the outer face in the vehicle width direction of the front bulkhead, and the rear wall portion, which extends from the rear edge of the side wall portion inwardly in the vehicle width direction and is connected to the rear face or the outer face in the vehicle width direction of the front bulkhead, it is possible to further enhance the rigidity of the joined part by forming a closed cross-section from the reinforcing member and the front bulkhead.

Moreover, in accordance with the thirteenth aspect of the present invention, since the rear wall portion juts out further inside in the vehicle width direction than the front wall portion, the preassembled front bulkhead can be assembled on the front side frame by inserting it from the front side of the vehicle body and, moreover, positioning the vertical member so that it abuts against the rear wall portion of the reinforcing member enables the ease of assembly of the front bulkhead to be enhanced.

Furthermore, in accordance with the fourteenth aspect of the present invention, since the reinforcing member is provided on both the upper side and the lower side of the front side frame, it is possible to more strongly join the front bulkhead and the front side frame.

Moreover, in accordance with the fifteenth aspect of the present invention, since the front bulkhead includes the bulkhead upper extending in the vehicle width direction, the pair of left and right vertical members extending in the vertical direction, and the pair of left and right curved corner members providing a connection between the bulkhead upper and the vertical member, the bulkhead upper and the corner member are formed so as to have a closed cross-section, and the vertical member is formed so as to have a closed cross-section or an open cross-section and, when it is formed so as to have an open cross-section, it is joined to the front side frame or the reinforcing member to thus form a closed cross-section, it is possible to enhance the strength of the bulkhead itself, thereby increasing the rigidity of the front portion of the vehicle body.

BRIEF DESCRIPTION OF DRAWINGS

FIG. 15 is a view showing another embodiment of a corner member. (eighth and ninth embodiments)

EXPLANATION OF REFERENCE NUMERALS AND SYMBOLS

Figure 1:
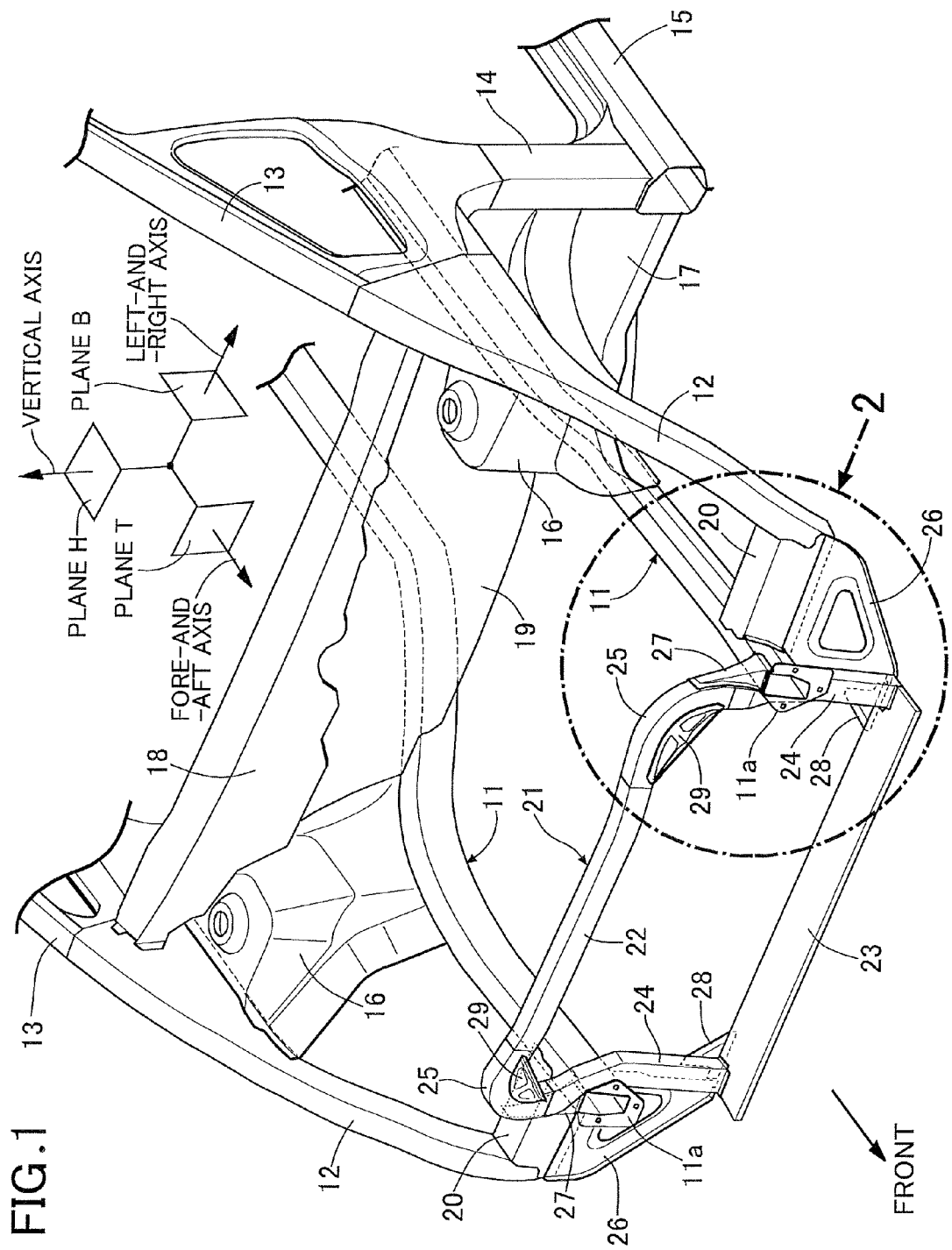
FIG. 1 is a perspective view showing a frame structure of a front portion of an automobile body. (first embodiment)
Figure 2:
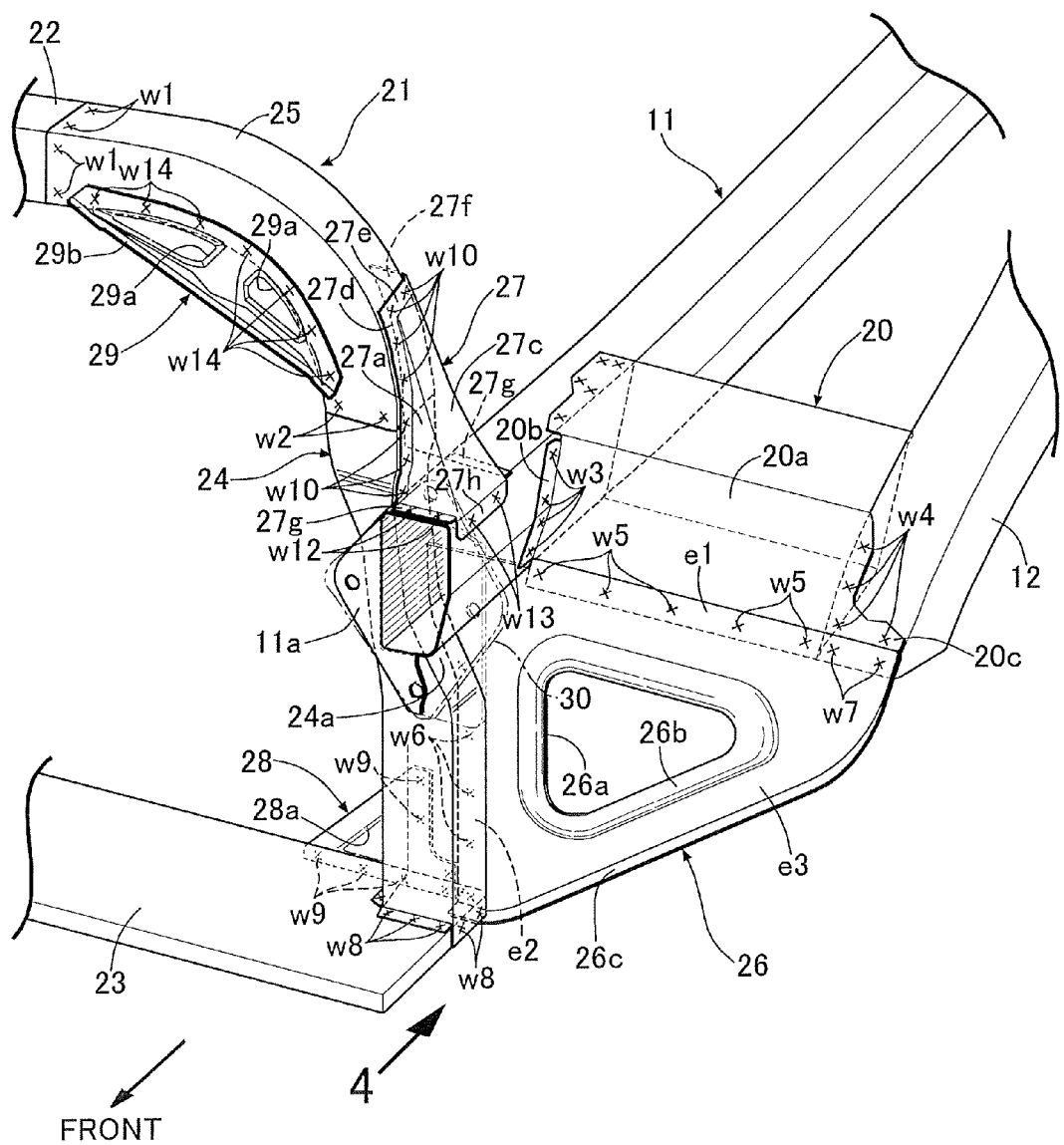
FIG. 2 is an enlarged view of part 2 in FIG. 1. (first embodiment)
Figure 3:
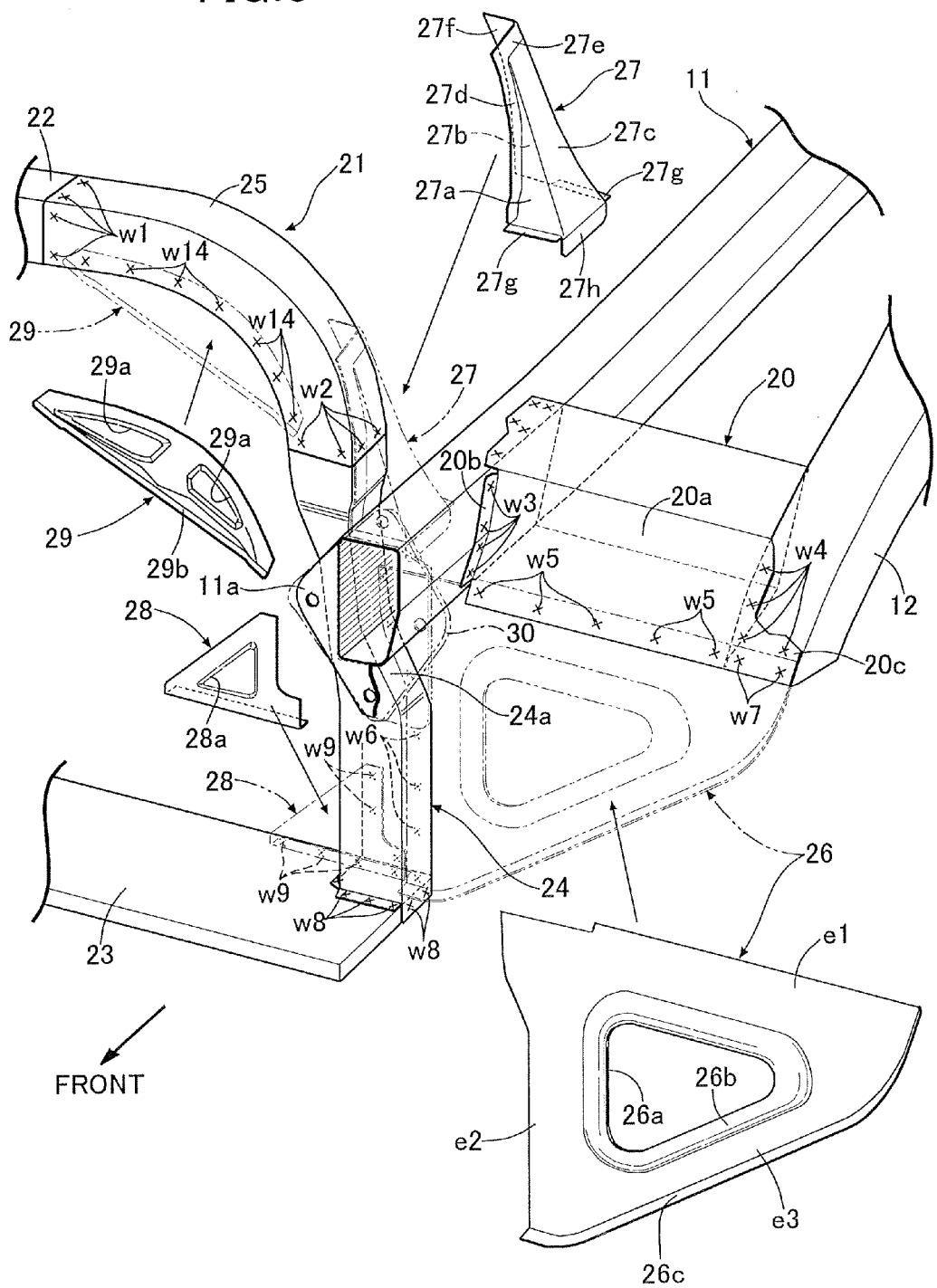
FIG. 3 is an exploded perspective view corresponding to FIG. 2. (first embodiment)
Figure 4:
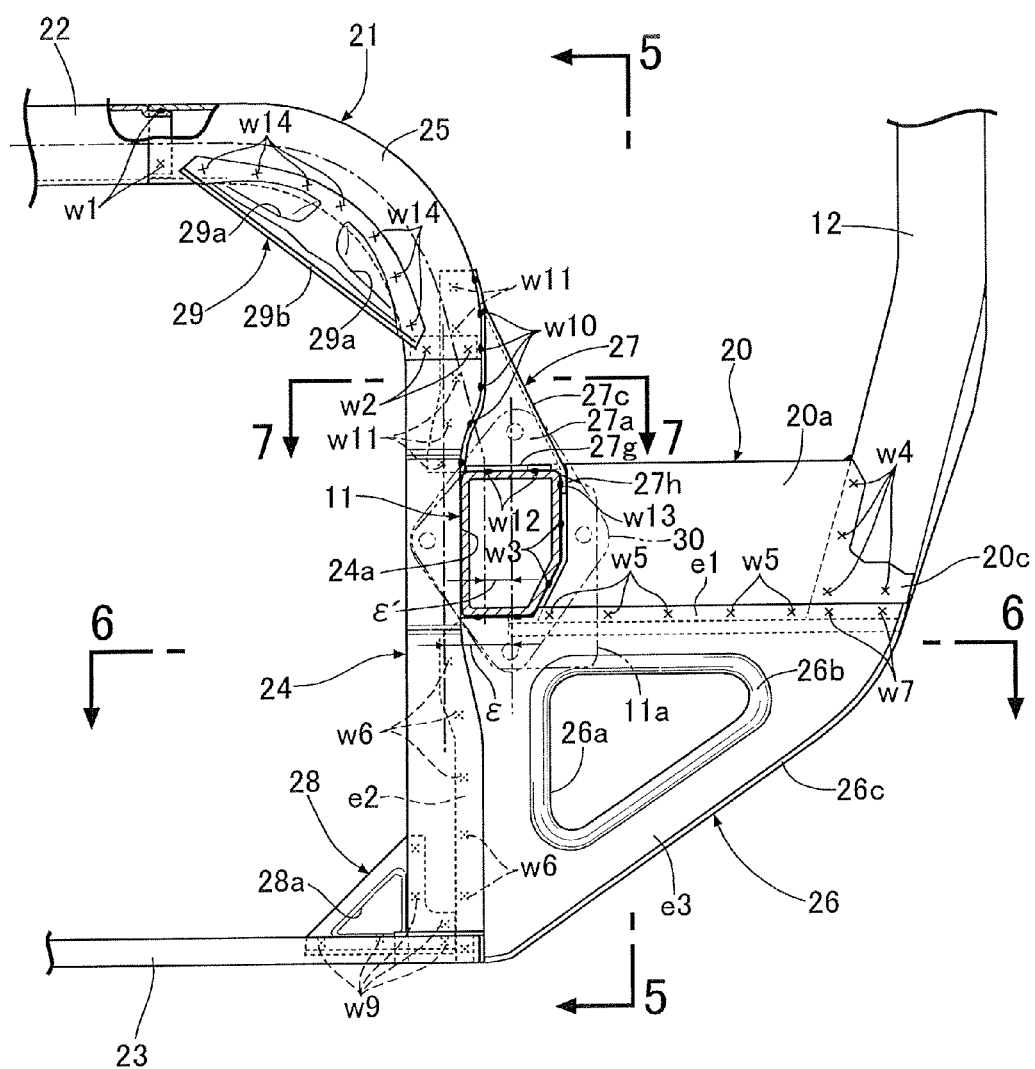
FIG. 4 is a view in the direction of arrow 4 in FIG. 2. (first embodiment)

11 Front side frame
12 Wheel house upper member
13 Front pillar upper (front pillar)
20 Side frame gusset
20a Front face
21 Front bulkhead
22 Bulkhead upper
23 Bulkhead lower
24 Bulkhead side (vertical member)
24a Recess
24d Rear face 25 Corner member
26 Linking panel
27 Reinforcing member
27a Front wall portion
27b Rear wall portion
27c Side wall portion
28 Reinforcing plate (first reinforcing plate)
29 Reinforcing plate (second reinforcing plate)
32 Subframe support bracket (vertical member)
e1 Horizontal edge portion
e2 Vertical edge portion
e3 Inclined edge portion

BEST MODE FOR CARRYING OUT THE
INVENTION

A first embodiment of the present invention is explained below by reference to FIG. 1 to FIG. 7.

First Embodiment

FIG. 1 shows a frame structure of a front portion of an automobile body. First, definitions of the fore-and-aft direction, the left-and-right direction (vehicle width direction), the vertical direction, a plane T, a plane B, and a plane H in the present specification are explained. The fore-and-aft direction, the left-and-right direction (vehicle width direction), and the vertical direction are defined with reference to an occupant seated on a driver's seat. The plane T referred to here is a plane that is perpendicular to an axis in the fore-and-aft direction and corresponds to for example a vehicle body front face or a vehicle body rear face. The plane B referred to here is a plane that is perpendicular to an axis in the left-and-right direction and corresponds to for example a vehicle body left side face or a vehicle body right side face. The plane H referred to here is a plane that is perpendicular to an axis in the vertical direction and corresponds to for example a vehicle body ceiling face or a vehicle body floor face. In addition, the plane T includes a plane that is inclined by an angle of less than 45° relative to the plane perpendicular to the axis in the fore-and-aft direction, the plane B includes a plane that is inclined by an angle of less than 45° relative to the plane perpendicular to the axis in the fore-and-aft direction, and the plane H includes a plane that is inclined by an angle of less than 45° relative to the plane perpendicular to the axis in the vertical direction.

A pair of left and right front side frames 11 and 11 supporting a power unit, which is not illustrated, having an integrated engine and transmission are disposed in the fore-and-aft direction, a front portion thereof extends in a substantially horizontal direction, and a rear portion thereof bends downwardly and inwardly in the vehicle width direction and then extends in a substantially horizontal direction on a lower face of a floor panel, which is not illustrated.

A pair of left and right wheel house upper members 12 and 12 disposed outside the left and right front side frames 11 and 11 in the vehicle width direction are disposed so as to be inclined downwardly in going toward the front from the rear, lower parts of a pair of left and right front pillar uppers 13 and 13 are connected to intermediate parts and rear parts in the fore-and-aft direction of the wheel house upper members 12 and 12, and lower ends of a pair of left and right front pillar lowers 14 and 14 extending downwardly from the lower parts of the front pillar uppers 13 and 13 are connected to front ends of a pair of left and right side sills 15 and 15 disposed in the fore-and-aft direction.

The rear parts of the wheel house upper members 12 and 12 and the front side frames 11 and 11 are connected via damper housings 16 and 16, and the front ends of the side sills 15 and 15 and the front side frames 11 and 11 are connected via outriggers 17 and 17. Furthermore, the left and right front pillar uppers 13 and 13 are connected via a dashboard upper 18 extending in the left-and-right direction, and the left and right damper housings 16 and 16 and the left and right front side frames 11 and 11 are connected via a dashboard lower 19 extending in the left-and-right direction. The front portions of the left and right front side frames 11 and 11 and the front ends of the wheel house upper members 12 and 12 are connected via a pair of left and right side frame gussets 20 and 20 extending in the left-and-right direction.

A rectangular frame-shaped front bulkhead 21 disposed in the front portion of the vehicle body includes a bulkhead upper 22 forming an upper side extending in the left-and-right direction, a bulkhead lower 23 forming a lower side extending in the left-and-right direction, a pair of left and right bulkhead sides 24 and 24 forming lateral sides extending in the vertical direction, and a pair of left and right corner members 25 and 25 bending through 90° and connecting left and right opposite ends of the bulkhead upper 22 and upper ends of the bulkhead sides 24 and 24. Due to inner faces in the vehicle width direction of the front ends of the left and right front side frames 11 and 11 being joined to outer faces in the vehicle width direction of the pair of left and right bulkhead sides 24 and 24, the front bulkhead 21 is supported by the front ends of the left and right front side frames 11 and 11.

In this arrangement, the bulkhead side 24, the side frame gusset 20, and the wheel house upper member 12 are linked and reinforced by a plate-shaped linking panel 26. The outer face in the vehicle width direction of the corner member 25 of the front bulkhead 21, the outer face in the vehicle width direction of the bulkhead side 24, and an upper face of the front portion of the front side frame 11 are linked and reinforced by a reinforcing member 27. Rear faces of parts where the bulkhead side 24 and the bulkhead lower 23 are joined are linked and reinforced by a plate-shaped reinforcing plate 28. The inside in the bending direction of the corner member 25 is reinforced by a plate-shaped reinforcing plate 29.

As shown in FIG. 2 to FIG. 5, the bulkhead upper 22 disposed in an upper part of the front bulkhead 21 is formed from a linear pipe material having a rectangular cross-section, and the corner members 25 and 25 fitted around opposite ends of the bulkhead upper 22 and joined by a weld w1 (see FIG. 2 to FIG. 4) are formed from a pipe material bent through 90° and having a rectangular cross-section. The bulkhead sides 24 and 24 fitted into the lower ends of the corner members 25 and 25 and joined by a weld w2 (see FIG. 2 to FIG. 4) are formed from a pipe material having a rectangular cross-section, and recesses 24a and 24a are formed by means of hydroforming, etc. so that the cross-section of an intermediate part in the vertical direction is narrow in part. That is, a side wall on the inside in the vehicle width direction of the bulkhead side 24 extends linearly in the vertical direction, but an intermediate part in the vertical direction of a side wall on the outside in the vehicle width direction is curved inwardly in the vehicle width direction, and the width in the left-and-right direction of the bulkhead side 24 of that portion is smaller than other parts. The bulkhead lower 23 is a flat plate-shaped member, and the lower ends of the left and right bulkhead sides 24 and 24 are joined to upper faces of left and right opposite end portions of the bulkhead lower 23.

The front side frame 11 is a tubular member having a pentagonal closed cross-section; an inner face in the vehicle width direction of the front end thereof abuts against the recess 24a of the bulkhead side 24 from the outside in the vehicle width direction, and the front side frame 11 is joined to the front bulkhead 21 via the reinforcing member 27. An opening part at the front end of the front side frame 11 is blocked by an end plate 30 joined to an end portion flange 11a.

Since the wheel house upper member 12 is inclined downwardly in going toward the front from the rear, a part where the wheel house upper member 12 and the front side frame 11 overlap becomes a parallel quadrilateral shape when viewed from the side. Therefore, the side frame gusset 20, which provides a connection between the front side frame 11 and the wheel house upper member 12 in the vehicle width direction, has a closed cross-section with a parallel quadrilateral shape (see FIG. 5).

A joining flange 20b extends forward from the inner end in the vehicle width direction of the front face 20a of the side frame gusset 20, and this joining flange 20b is joined by a weld w3 (see FIG. 2 and FIG. 3) within the plane B (plane perpendicular to axis in the left-and-right direction) to an outer face in the vehicle width direction of the front side frame 11. Furthermore, a joining flange 20c extends outwardly in the vehicle width direction from the front face 20a of the side frame gusset 20, and this joining flange 20c is joined by a weld w4 (see FIG. 2 to FIG. 4) within the plane T (plane perpendicular to axis in the fore-and-aft direction) to the front end of the wheel house upper member 12.

The linking panel 26 disposed within the plane T is a right-angled triangular plate-shaped member when viewed from the front and includes a horizontal edge portion e1 extending in the left-and-right direction, a vertical edge portion e2 extending in the vertical direction, and an inclined edge portion e3 inclined relative to the left-and-right direction and the vertical direction. A right-angled triangular opening 26a for reducing the weight is formed in a central part of the linking panel 26, a reinforcing bead 26b is formed at the edge of the opening 26a, and a reinforcing flange 26c is formed on the inclined edge portion e3.

The horizontal edge portion e1 of the linking panel 26 is superimposed on a lower part of the front face 20a of the side frame gusset 20 and joined by a weld w5 (see FIG. 2 to FIG. 5) within the plane T. Furthermore, the vertical edge portion e2 of the linking panel 26 is superimposed on a rear face of the bulkhead side 24 beneath the front side frame 1 and joined by a weld w6 (see FIG. 3, FIG. 4, and FIG. 6) within the plane T. Moreover, the apex where the horizontal edge portion e1 and the inclined edge portion e3 of the linking panel 26 intersect each other is superimposed on a front end part of the wheel house upper member 12 together with the joining flange 20c of the front face 20a of the side frame gusset 20 and joined by a weld w7 (see FIG. 2 to FIG. 4) within the plane T.

The lower end of the bulkhead side 24 is joined to an upper face and a side face of the bulkhead lower 23 by a weld w8 (see FIG. 2, FIG. 3, and FIG. 5), and the reinforcing plate 28, which is a plate-shaped member with a right-angled triangle shape having an opening 28a in the center, is joined by a weld w9 (see FIG. 3, FIG. 4, and FIG. 6) to a rear face of a corner where the bulkhead side 24 and the bulkhead lower 23 are joined. The reinforcing plate 28 is disposed within the plane T and is positioned on the same plane as the linking panel 26, which is also disposed within the plane T.

The reinforcing member 27 is press formed from a steel sheet so as to have a squared U-shaped cross-section and includes a front wall portion 27a and a rear wall portion 27b that are positioned within the plane T and a side wall portion 27c positioned within the plane B. A joining flange 27d provided at the front edge of the triangular front wall portion 27a and a joining flange 27e provided at the upper edge of the band-shaped side wall portion 27c are fixed by a weld w10 (see FIG. 2, FIG. 4, and FIG. 5) within the plane B to an outer face in the vehicle width direction of an upper part of the bulkhead side 24 and an outer face in the vehicle width direction of an upper part of the corner member 25. Furthermore, a joining flange 27f formed by extending the rear wall portion 27b inwardly in the vehicle width direction is fixed by a weld w11 (see FIG. 4 and FIG. 7) within the plane T to a rear face of an upper part of the bulkhead side 24 and a rear face of a lower part of the corner member 25.

Furthermore, a joining flange 27g formed by bending forward the lower end of the front wall portion 27a and a joining flange 27g formed by bending rearward the lower end of the rear wall portion 27b are joined by a weld w12 (see FIG. 2, FIG. 4, FIG. 5, and FIG. 7) within the plane H (plane perpendicular to axis in the vertical direction) to an upper face of the front side frame 11. Moreover, a joining flange 27h formed by extending downwardly the lower end of the side wall portion 27c is joined by a weld w13 (see FIG. 4 and FIG. 5) within the plane B to an outer face in the vehicle width direction of the front side frame 11.

The side wall portion 27c of the reinforcing member 27 extends so as to smoothly connect an outer face in the vehicle width direction of the corner member 25 of the front bulkhead 21 and an outer face in the vehicle width direction of the front side frame 11, and is fixed so that the front side frame 11 is sandwiched between the joining flange 27h extending downwardly from the lower end of the side wall portion 27c and the recess 24a of the bulkhead side 24.

The plate-shaped reinforcing plate 29 joined by a weld w14 (see FIG. 2 to FIG. 5) to the inside in the bending direction of the corner member 25 is reinforced by two beads 29a and 29a and a flange 29b formed on a linear part.

The operation of the embodiment of the present invention having the above arrangement is now explained.

Since the front side frame 11 and the wheel house upper member 12 are members extending in substantially the fore-and-aft direction, the front end parts thereof are hardly displaced in the fore-and-aft direction, and since they are displaced mainly in the left-and-right direction and in the vertical direction, by linking the front end part of the front side frame 11 and the front end part of the wheel house upper member 12 by means of the linking panel 26 disposed within the plane T, which includes the direction of the above displacement, it is possible to suppress relative displacement between the two within the plane T, thus enhancing the rigidity of the vehicle body.

In this arrangement, since the linking panel 26 is a right-angled triangular plate-shaped member, the horizontal edge portion e1 is joined to the side frame gusset 20, which connects the front side frame 11 and the wheel house upper member 12 in the left-and-right direction, and the vertical edge portion e2 is joined to the bulkhead side 24 fixed to the front side frame 11, not only is the plane rigidity of the linking panel 26 itself enhanced, but also since the weld w5 between the horizontal edge portion e1 and the side frame gusset 20, the weld w7 between the horizontal edge portion e1 and the front end of the wheel house upper member 12, and the weld w6 between the vertical edge portion e2 and the bulkhead side 24 are all present within the plane T, it is possible to prevent a bending moment from being imposed on the linking panel 26 and for it to be subjected only to a pure shear force, thus outstandingly enhancing the reinforcing effect. Moreover, since the linking panel 26 is one plate-shaped member and very lightweight, it is possible to minimize any increase in weight.

Figure 6:
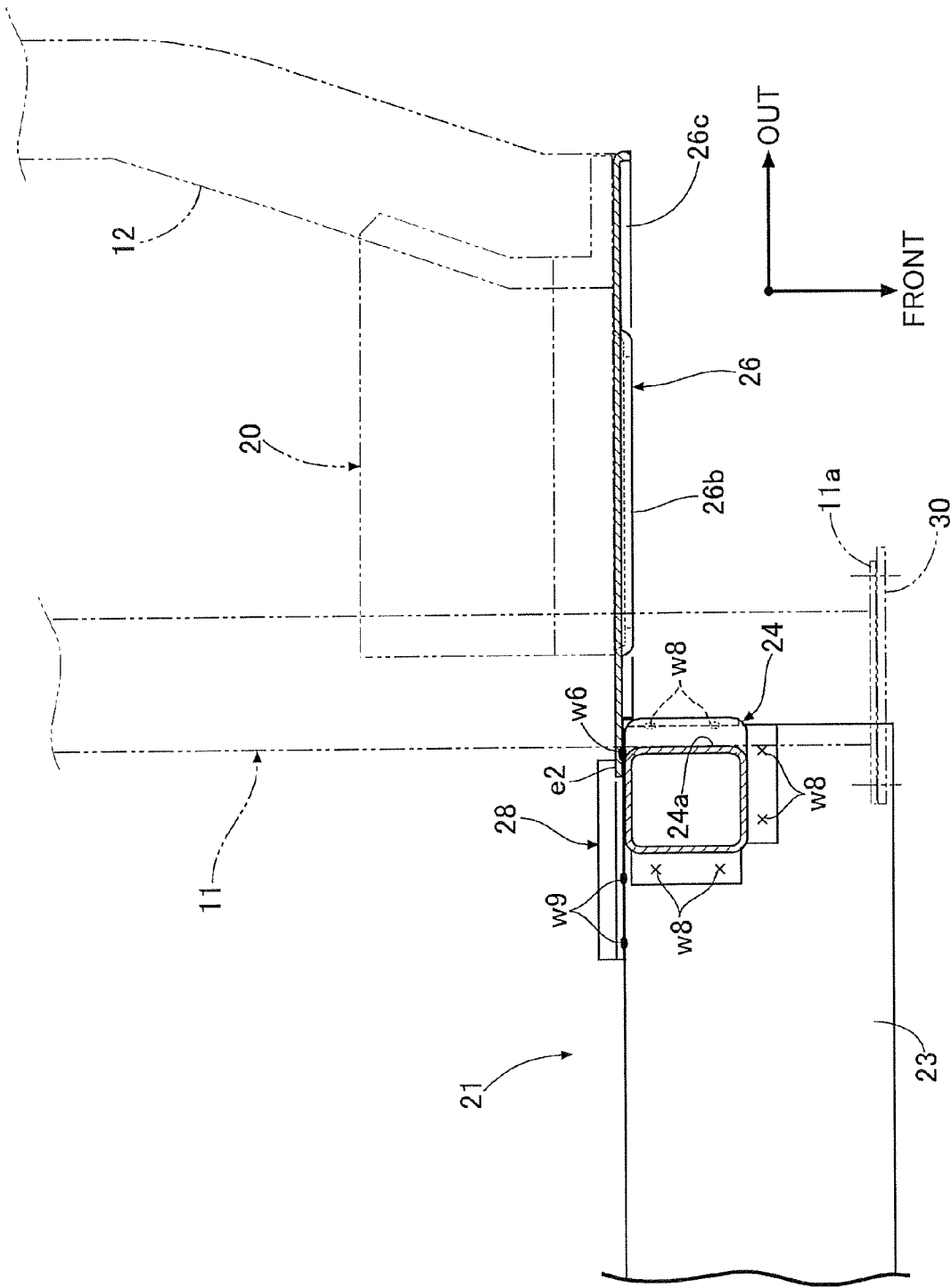
FIG. 6 is a sectional view along line 6-6 in FIG. 4. (first embodiment)

As is clear from FIG. 6, since the part where the bulkhead side 24 and the bulkhead lower 23 of the front bulkhead 21 are joined is within the plane T and is reinforced by the reinforcing plate 28 disposed within the same plane as the linking panel 26, not only is the rigidity of the front bulkhead 21 enhanced, but also the rigidity of the front portion of the vehicle body is further enhanced by transmitting the load from the front side frame 11 or the wheel house upper member 12 to the bulkhead lower 23 via the reinforcing plate 28.

Furthermore, since the pair of left and right corner members 25 and 25 linking the bulkhead upper 26 and the bulkhead sides 24 and 24 are formed integrally from a bent hollow steel tube, not only can the rigidity of the entire front bulkhead 21 be enhanced by increasing the rigidity of the corner parts where the bulkhead upper 26 and the bulkhead sides 24 and 24 are joined, but also the load can be smoothly transmitted from the bulkhead sides 24 and 24 to the bulkhead upper 26 during travel of the vehicle due to the bent shape of the corner members 25 and 25.

Moreover, in order to efficiently carry out load transmission between the front side frame 11 and the bulkhead side 24, it is desirable that the axis of the front side frame 11 and the axis of the bulkhead side 24 intersect each other, but in practice since it is necessary to join the outer face in the vehicle width direction of the bulkhead side 24 to the inner face in the vehicle width direction of the front side frame 11, configuration in such a way is difficult.

In the present embodiment, since the recess 24a is formed by curving the intermediate part in the vertical direction of the bulkhead side 24 inwardly in the vehicle width direction, and the inner face in the vehicle width direction of the front side frame 11 is made to abut against the recess 24a, it is possible to reduce a distances (see FIG. 4) between the axis of the bulkhead side 24 and the axis of the front side frame 11, thus enhancing the efficiency of transmitting a load between the front side frame 11 and the bulkhead side 24. Since the bulkhead side 24 is molded by hydroforming, it is easy to provide the recess 24a.

Moreover, since the outer face in the vehicle width direction above the recess 24a of the bulkhead side 24 and the upper face and outer face in the vehicle width direction of the front side frame 11 are connected via the reinforcing member 27, not only can the rigidity of the part where the bulkhead side 24 and the front side frame 11 are joined be enhanced, but also a distance ϵ' (see FIG. 4) between the axis of the front side frame 11 and the virtual axis of the bulkhead side 24 can be made smaller than the distance ϵ by moving the virtual axis of the bulkhead side 24 outwardly in the vehicle width direction.

In particular, the reinforcing member 27 has a squared U-shaped cross-section and forms a closed cross-section by being joined to the bulkhead side 24 and the corner member 25, and the reinforcing effect thereof is therefore very high. Moreover, since the side wall portion 27c of the reinforcing member 27 provides a smooth connection between the outer face in the vehicle width direction of the corner member 25 and the outer face in the vehicle width direction of the front side frame 11, it is possible to carry out load transmission between the corner member 25 and the front side frame 11 smoothly.

Figure 7:
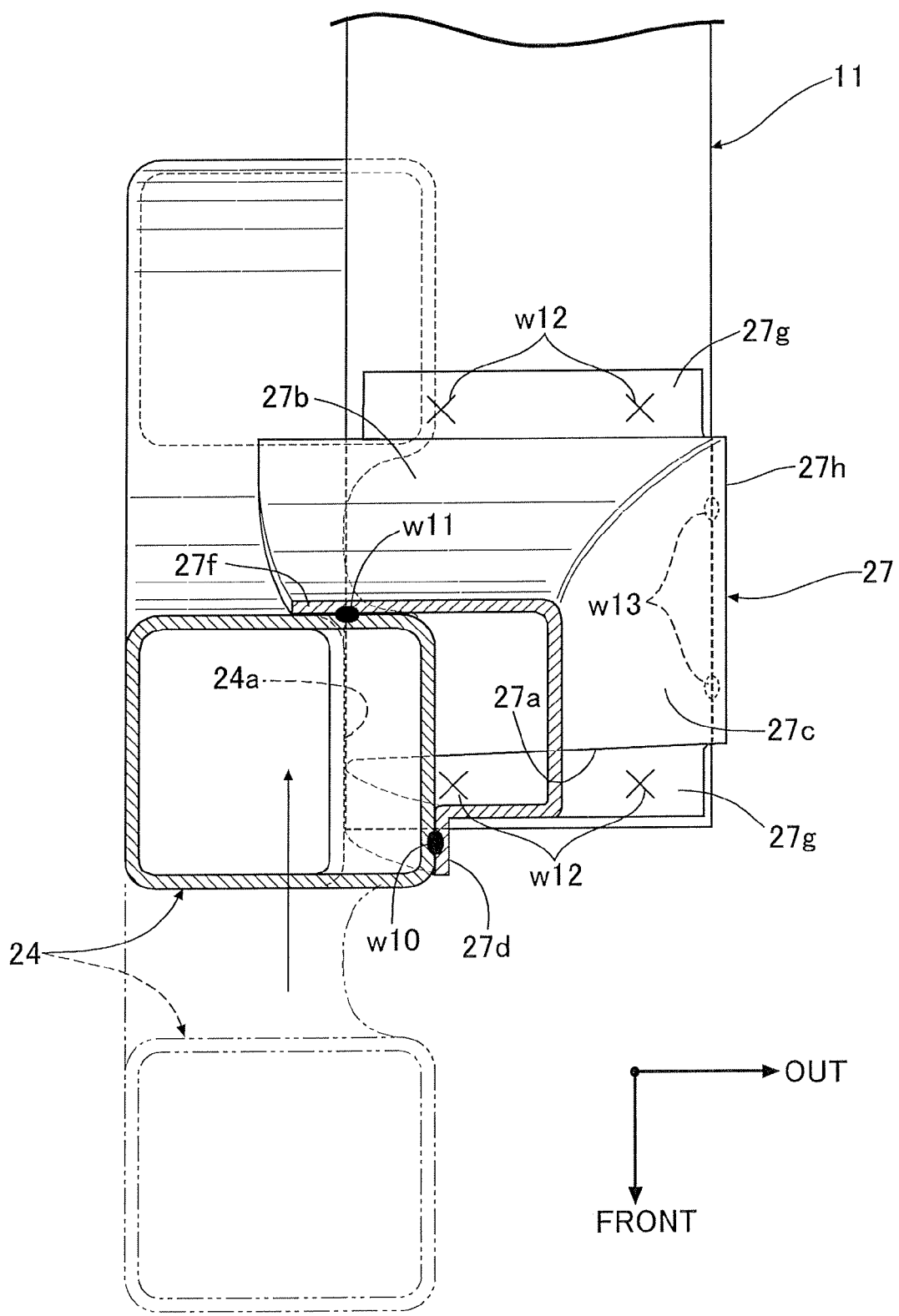
FIG. 7 is a sectional view along line 7-7 in FIG. 4. (first embodiment)

Furthermore, since the rear wall portion 27b of the reinforcing member 27 extends so as to jut out inwardly in the vehicle width direction with respect to the front wall portion 27a, as shown in FIG. 7 in a state in which the reinforcing member 27 is fixed to the front side frame 11 in advance, the front bulkhead 21 preassembled into a frame shape is moved from the front to the rear so as to make the bulkhead side 24 abut against the joining flange 27f of the rear wall portion 27b of the reinforcing member 27 to thus carry out positioning, and it is therefore possible to facilitate the operation of assembling the front side frames 11 and 11 and the front bulkhead 21.

In this arrangement, it is not necessary to set the positional relationship between the reinforcing members 27 and 27 fixed to the front side frames 11 and 11 and the bulkhead sides 24 and 24 of the front bulkhead 21 with particularly good precision, the left and right bulkhead sides 24 and 24 may be fitted only between the left and right reinforcing members 27 and 27, and there is no particular influence on the cost of machining each member or the cost of assembly.

A second embodiment of the present invention is now explained by reference to FIG. 8.

Second Embodiment

Figure 5:
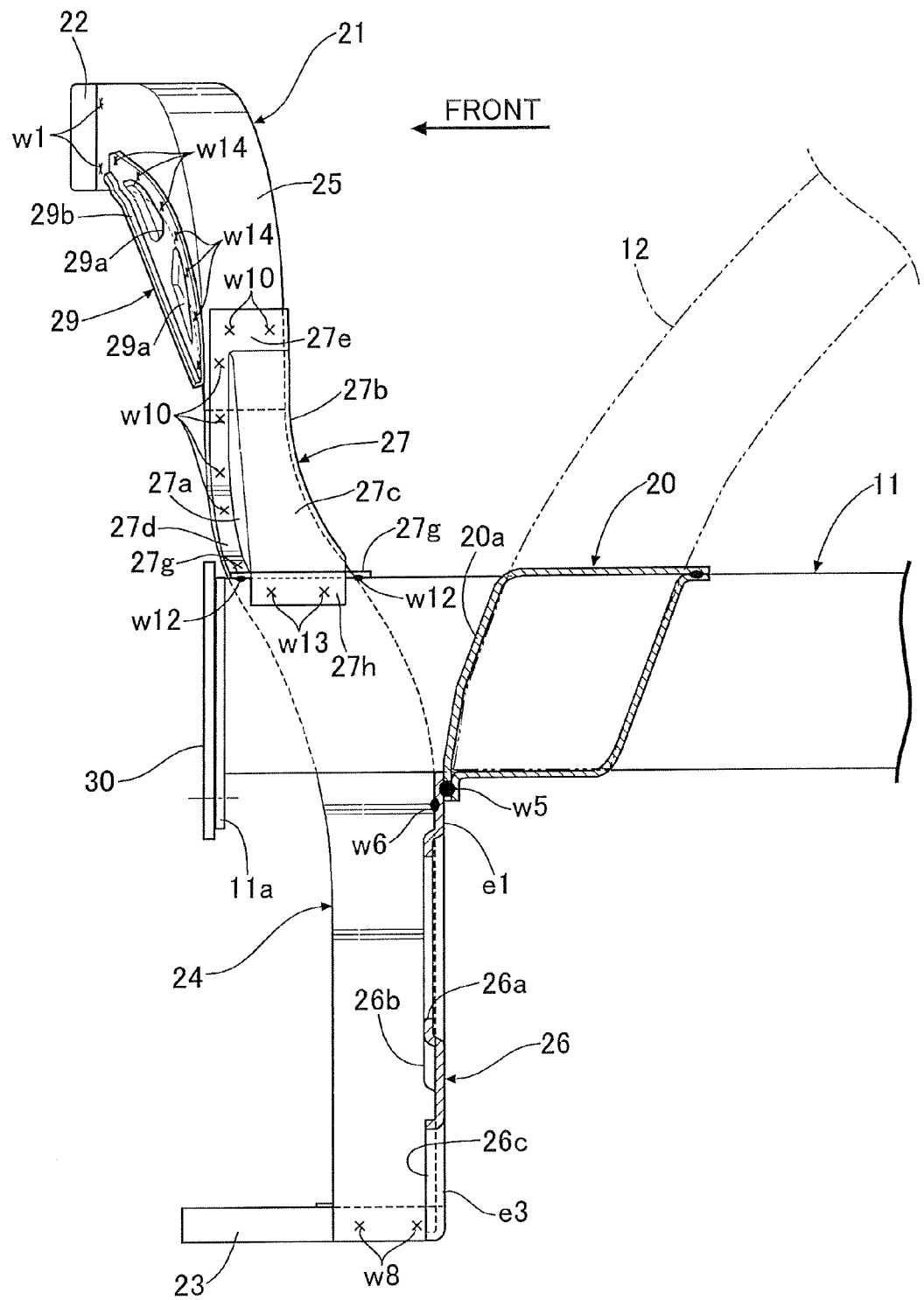
FIG. 5 is a sectional view along line 5-5 in FIG. 4. (first embodiment)
Figure 8:
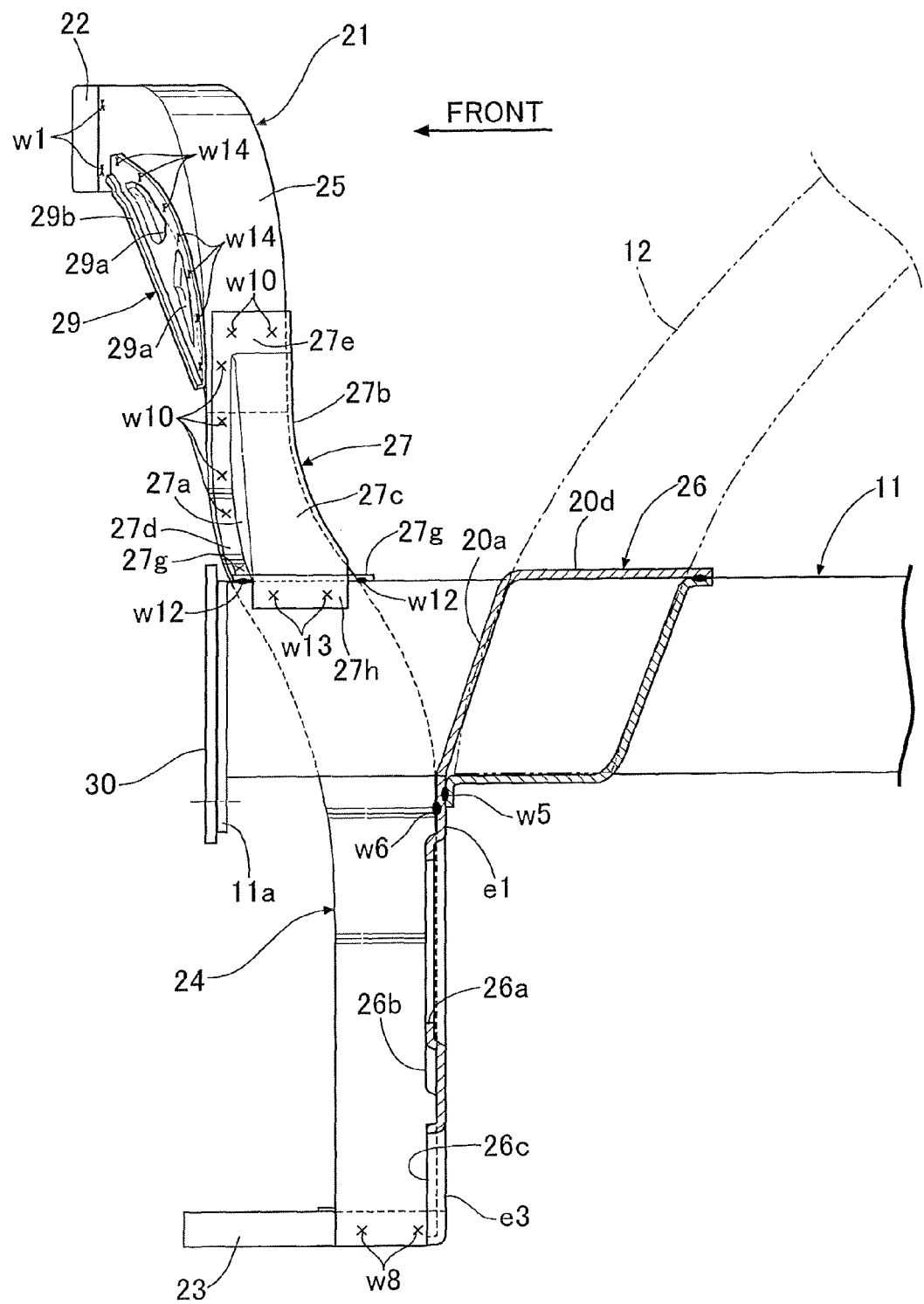
FIG. 8 is a view corresponding to FIG. 5. (second embodiment)

In the first embodiment shown in FIG. 5, the side frame gusset 20 is formed by joining two members having an L-shaped cross-section, and the horizontal edge portion e1 of the linking panel 26 is joined by the weld W5 to the front face 20a, but in the second embodiment shown in FIG. 8 a front face 20a and an upper face 20d of a side frame gusset 20 are formed integrally by extending a horizontal edge portion e1 of a linking panel 26 upwardly and rearwardly.

In this way, forming the front face 20a and the upper face 20d of the side frame gusset 20 integrally with the linking panel 26 enables the number of components and the number of welding steps to be reduced and the weight to be cut. Instead of forming the front face 20a and the upper face 20d of the side frame gusset 20 integrally with the linking panel 26, only the front face 20a of the side frame gusset 20 may be formed integrally with the linking panel 26.

A third embodiment of the present invention is now explained by reference to FIG. 9.

Third Embodiment

Figure 9:
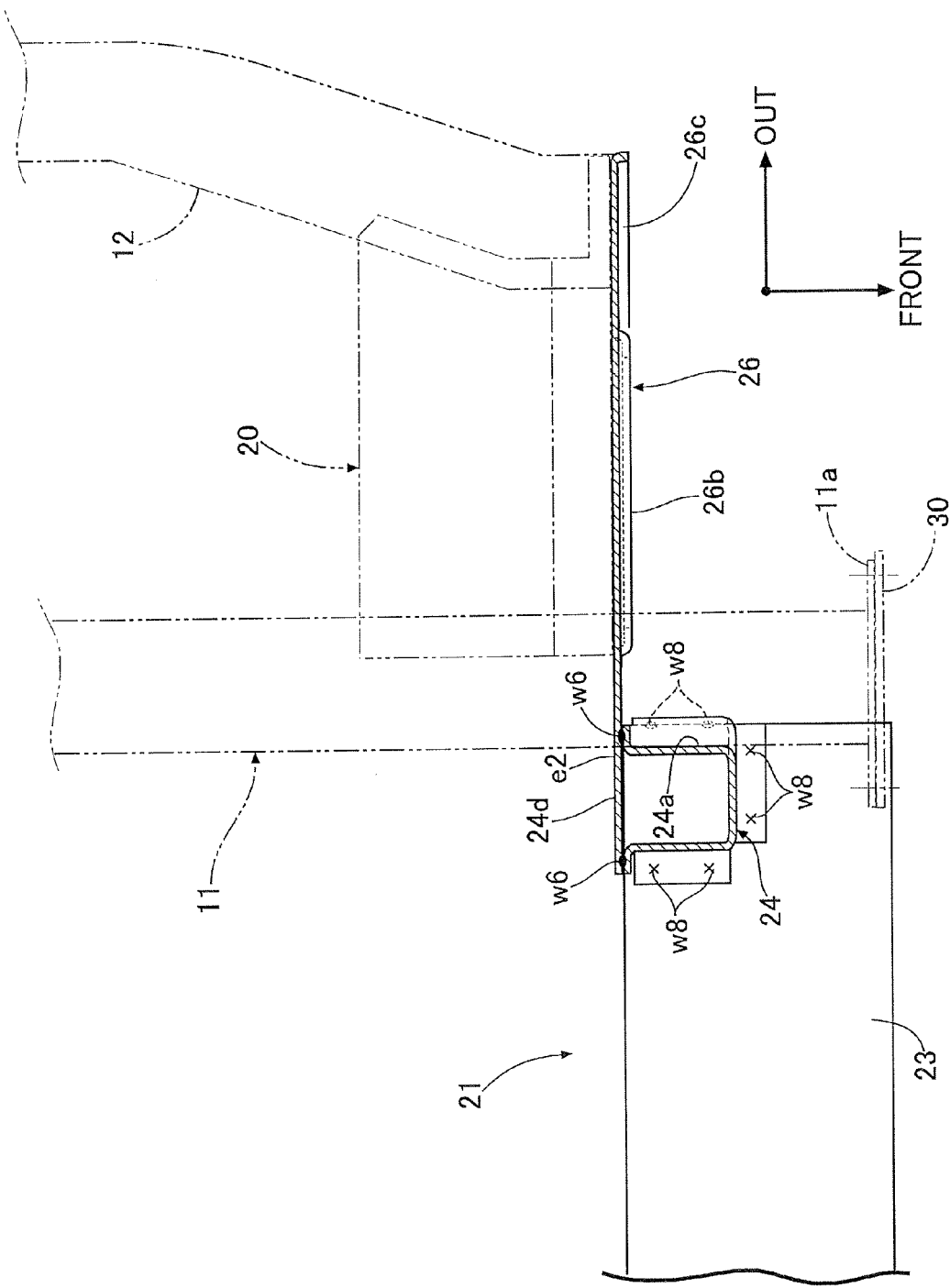
FIG. 9 is a view corresponding to FIG. 6. (third embodiment)

In the first embodiment shown in FIG. 6, the bulkhead side 24 is formed by hydroforming so as to have a rectangular closed cross-section, and the vertical edge portion e2 of the linking panel 26 is joined by the weld W6 to the rear face of the bulkhead side 24, but in the third embodiment shown in FIG. 9 a bulkhead side 24 is formed by press forming a steel sheet so as to have a squared U-shaped cross-section opening rearwardly, and a rear face 24d of the bulkhead side 24 is formed by joining by a weld w6 a portion formed by extending inwardly in the vehicle width direction a vertical edge portion e2 of a linking panel 26 so as to block an opening part of the bulkhead side 24.

In this way, forming the rear face 24d of the bulkhead side 24 integrally with the linking panel 26 enables the weight to be reduced. Instead of forming the rear face 24d of the bulkhead side 24 integrally with the linking panel 26, a front face of the bulkhead side 24 may be formed integrally with the linking panel 26.

Figure 10:
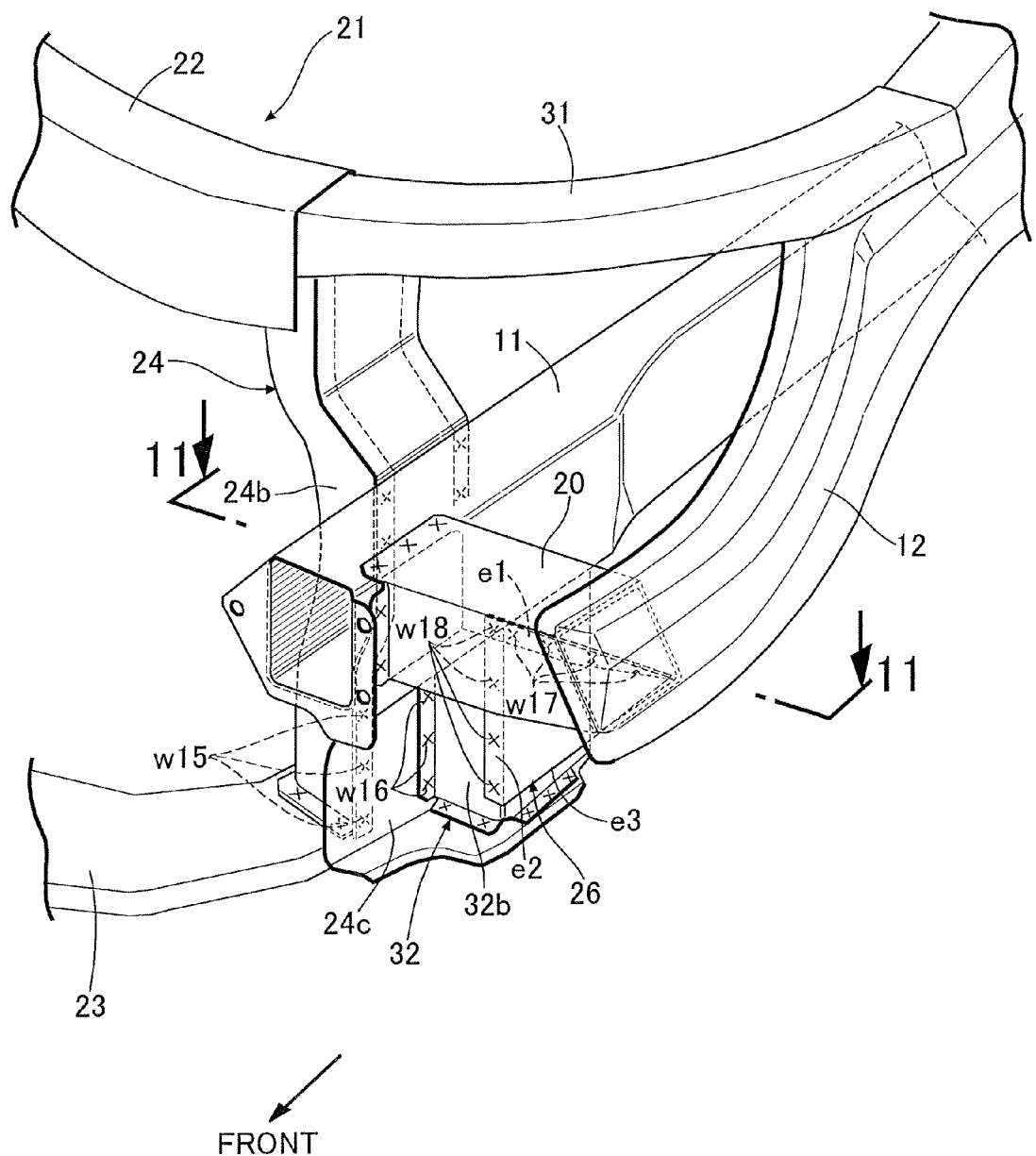
FIG. 10 is a view corresponding to FIG. 2. (fourth embodiment)
Figure 11:
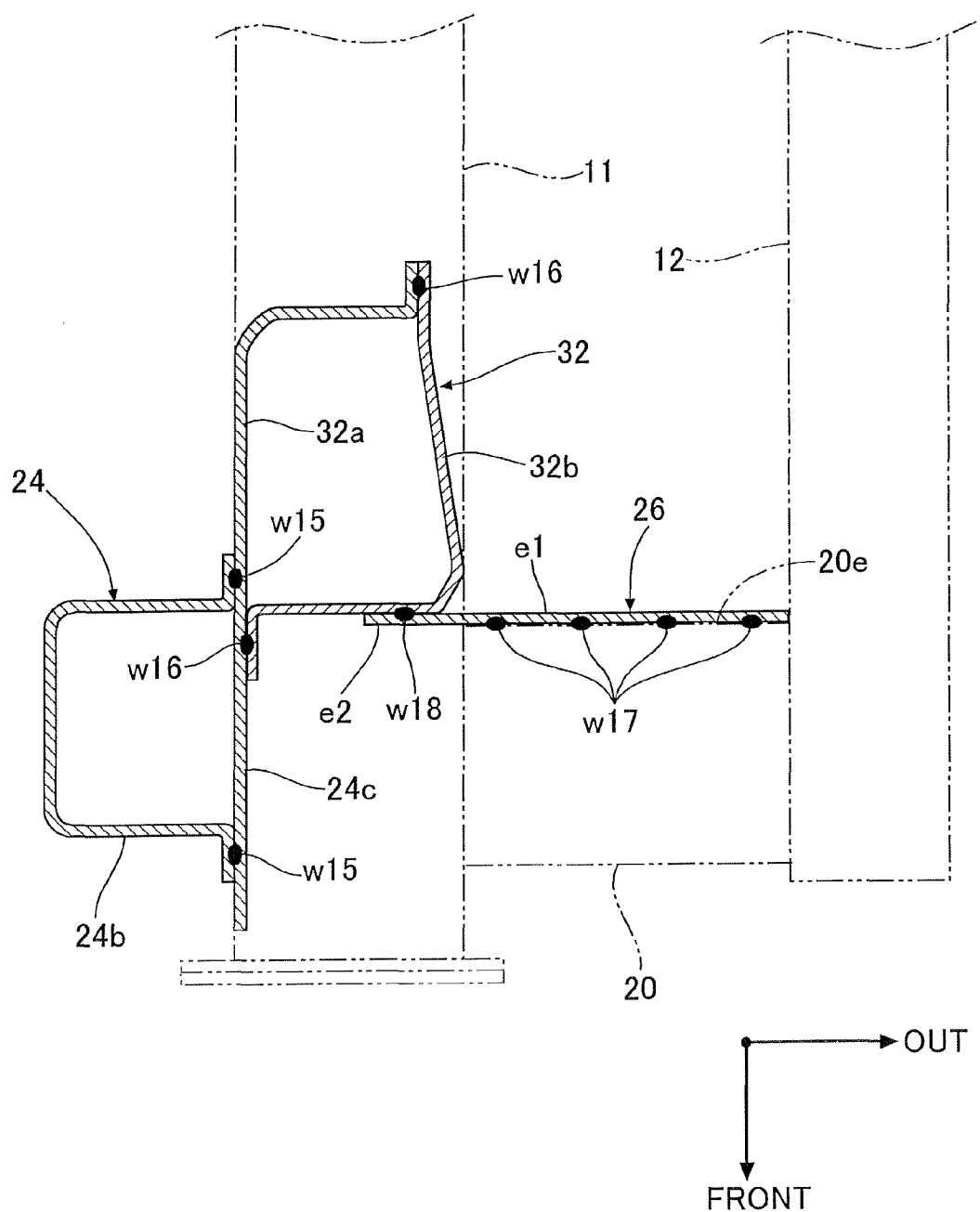
FIG. 11 is a sectional view along line 11-11 in FIG. 10. (fourth embodiment)

A fourth embodiment of the present invention is now explained by reference to FIG. 10 and FIG. 11.

Fourth Embodiment

In the fourth embodiment, a front bulkhead 21 is formed into a frame shape while having a bulkhead upper 22, a bulkhead lower 23, and left and right bulkhead sides 24 and 24, an inner face in the vehicle width direction of a front end of a front side frame 11 is joined to an outer face in the vehicle width direction of the bulkhead side 24, and an outer face in the vehicle width direction of the front end of the front side frame 11 and an inner face in the vehicle width direction of a front end of a wheel house upper member 12 are linked via a side frame gusset 20 extending in the left-and-right direction. Furthermore, an intermediate part in the fore-and-aft direction of the wheel house upper member 12 and an end part in the left-and-right direction of the bulkhead upper 22 are linked via a linking member 31 curving into an arc shape.

The bulkhead side 24 is formed by joining by a weld w15 an inner member 24b having a squared U-shaped cross-section opening outwardly in the vehicle width direction and a flat plate-shaped outer member 24c blocking the opening part of the inner member 24b so that it has a closed cross-section. In order to suspendingly support a front subframe, which is not illustrated, supporting an engine or a transmission on the left and right front side frames 11 and 11, a front portion of each front side frame 11 is provided with a subframe support bracket 32. The subframe support bracket 32 includes an inner member 32a formed by extending the outer member 24c of the bulkhead side 24 rearwardly and bending it inwardly in the vehicle width direction, and an outer member 32b joined by a weld w16 to the inner member 32a and the outer member 24c of the bulkhead side 24 so as to form a closed cross-section.

A linking panel 26 disposed within a plane T is a right-angled triangular member as in the first embodiment, a horizontal edge portion e1 thereof is joined to a rear face 20e of the side frame gusset 20 by a weld w17 within the plane T, and a vertical edge portion e2 thereof is joined to a front face of the outer member 32b of the subframe support bracket 32 by a weld w18 within the plane T.

The linking panel 26 of the fourth embodiment is also formed from one sheet of plate material disposed within the plane T, and the same operational effects as those of the linking panel 26 of the first embodiment can be achieved.

Figure 12:
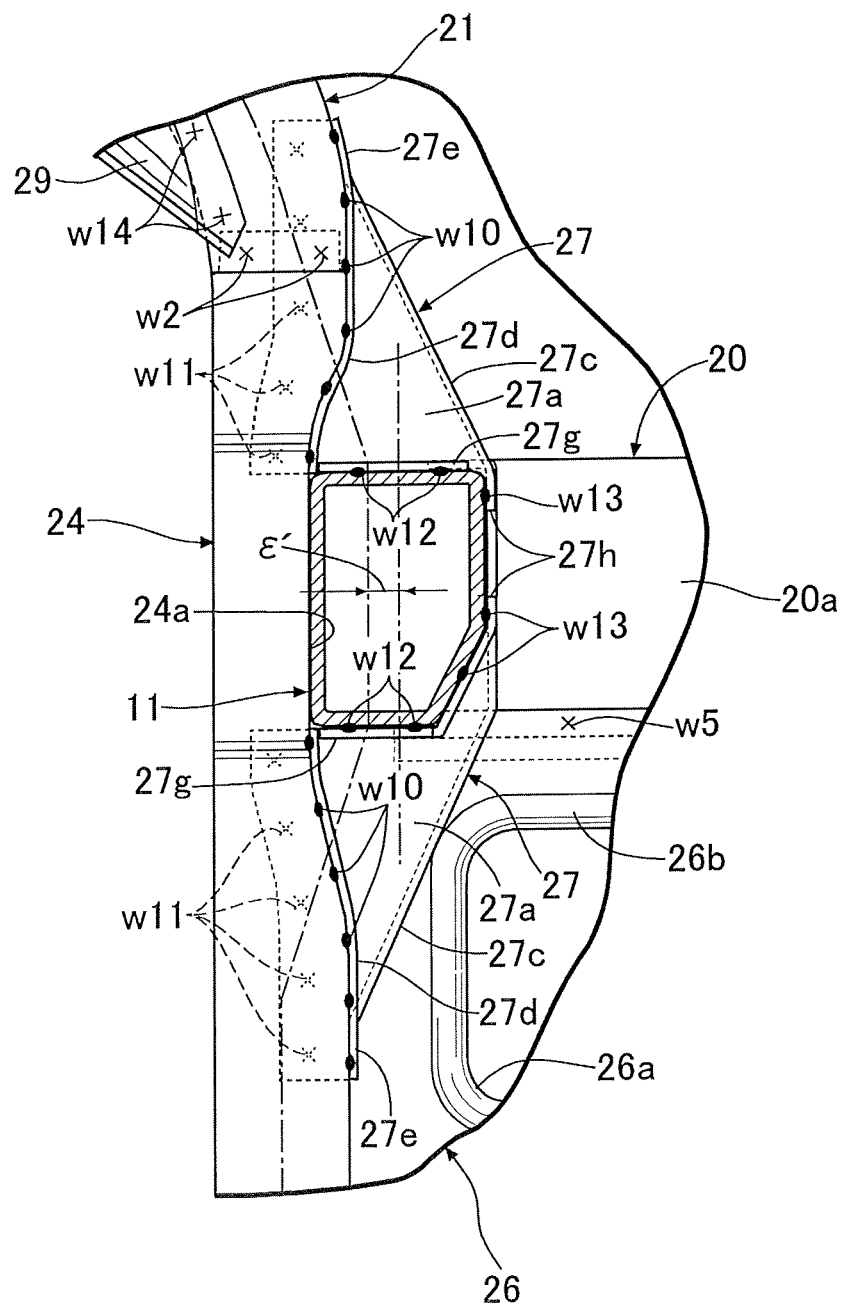
FIG. 12 is a view corresponding to an essential part of FIG. 4. (fifth embodiment)

A fifth embodiment of the present invention is now explained by reference to FIG. 12.

Fifth Embodiment

In the first embodiment, the upper face of the front side frame 11 and the outer face in the vehicle width direction of the bulkhead side 24 extending upwardly therefrom are joined via the reinforcing member 27, but in the fifth embodiment a lower face of a front side frame 11 and an outer face in the vehicle width direction of a bulkhead side 24 extending downwardly therefrom are also joined via a reinforcing member 27.

In this way, providing two, that is, upper and lower, reinforcing members 27 and 27 not only enables the strength with which the front side frame 11 and the bulkhead side 24 are joined to be further enhanced, but also enables the virtual axis of the bulkhead side 24 to be moved further outside in the vehicle width direction and a distance ϵ' between the axis of the front side frame 11 and the virtual axis of the bulkhead side 24 to be further reduced, thereby enabling load transmission between the front side frame 11 and the bulkhead side 24 to be carried out more smoothly.

Figure 13:
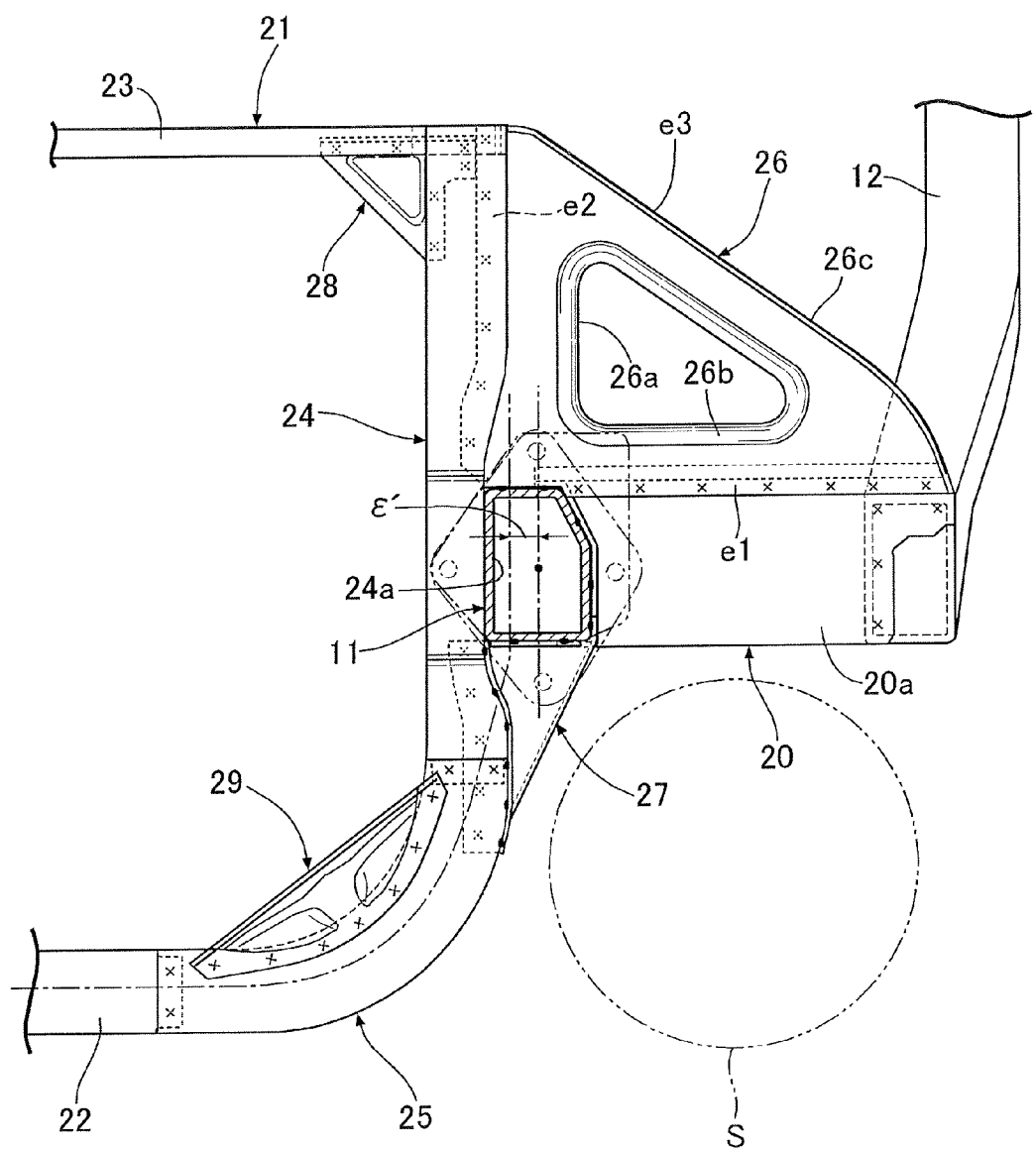
FIG. 13 is a view corresponding to FIG. 4. (sixth embodiment)

A sixth embodiment of the present invention is now explained by reference to FIG. 13.

Sixth Embodiment

In the sixth embodiment, members such as the front bulkhead 21, the linking panel 26, the reinforcing member 27, the reinforcing plate 28, and the reinforcing plate 29 of the first embodiment are turned upside down as they are, and supported on front portions of front side frames 11 and 11 and wheel house upper members 12 and 12.

In accordance with the sixth embodiment, while achieving the operational effects of the first embodiment as they are, it becomes possible to dispose in-vehicle components such as an intercooler or a washer tank while utilizing a space S formed between linking panels 26 and 26 and corner members 25 and 25 of a front bulkhead 21.

Seventh to ninth embodiments of the present invention are now explained by reference to FIG. 14 and FIG. 15.

Seventh to Ninth Embodiments

Figure 14:
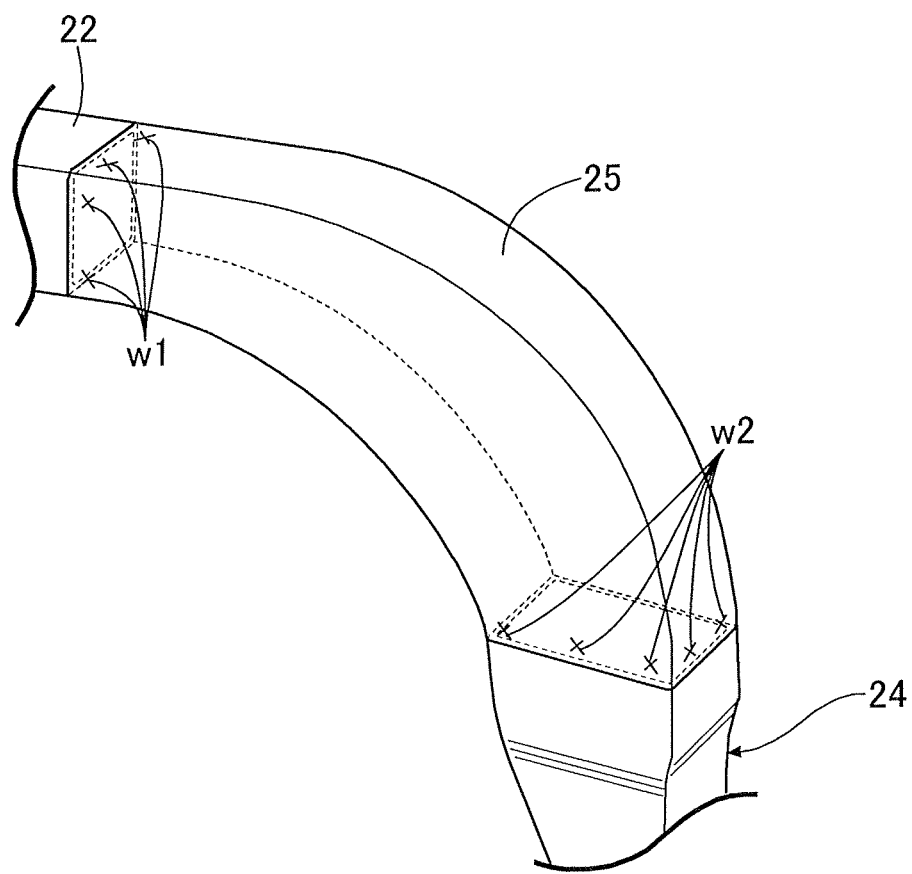
FIG. 14 is a view showing another embodiment of a corner member. (seventh embodiment)

In the first embodiment, the corner member 25 of the front bulkhead 21 is formed from a pipe material having a fixed rectangular cross-section, but in the seventh embodiment shown in FIG. 14, the dimensions of a rectangular cross-section of a corner member 25 formed from a pipe material change in the longitudinal direction. Increasing the dimensions of the cross-section of an intermediate part in the longitudinal direction of the corner member 25 can eliminate the necessity for a reinforcing plate 29. Furthermore, in the eighth and ninth embodiments shown in FIG. 15 a corner member 25 is formed from a pipe material having a circular cross-section or a trapezoidal cross-section.

In accordance with these embodiments, the same operational effects as those of the first embodiment can be achieved.

Other embodiments of the structure of the part where the bulkhead side 24 and the reinforcing member 27 are joined are now explained. In the first embodiment, the bulkhead side 24 is formed from a pipe material having a closed cross-section, but in the embodiments below a bulkhead side 24 is formed from a pressed material having a closed cross-section or an open cross-section.

Tenth to Fifteenth Embodiments

Figure 16:
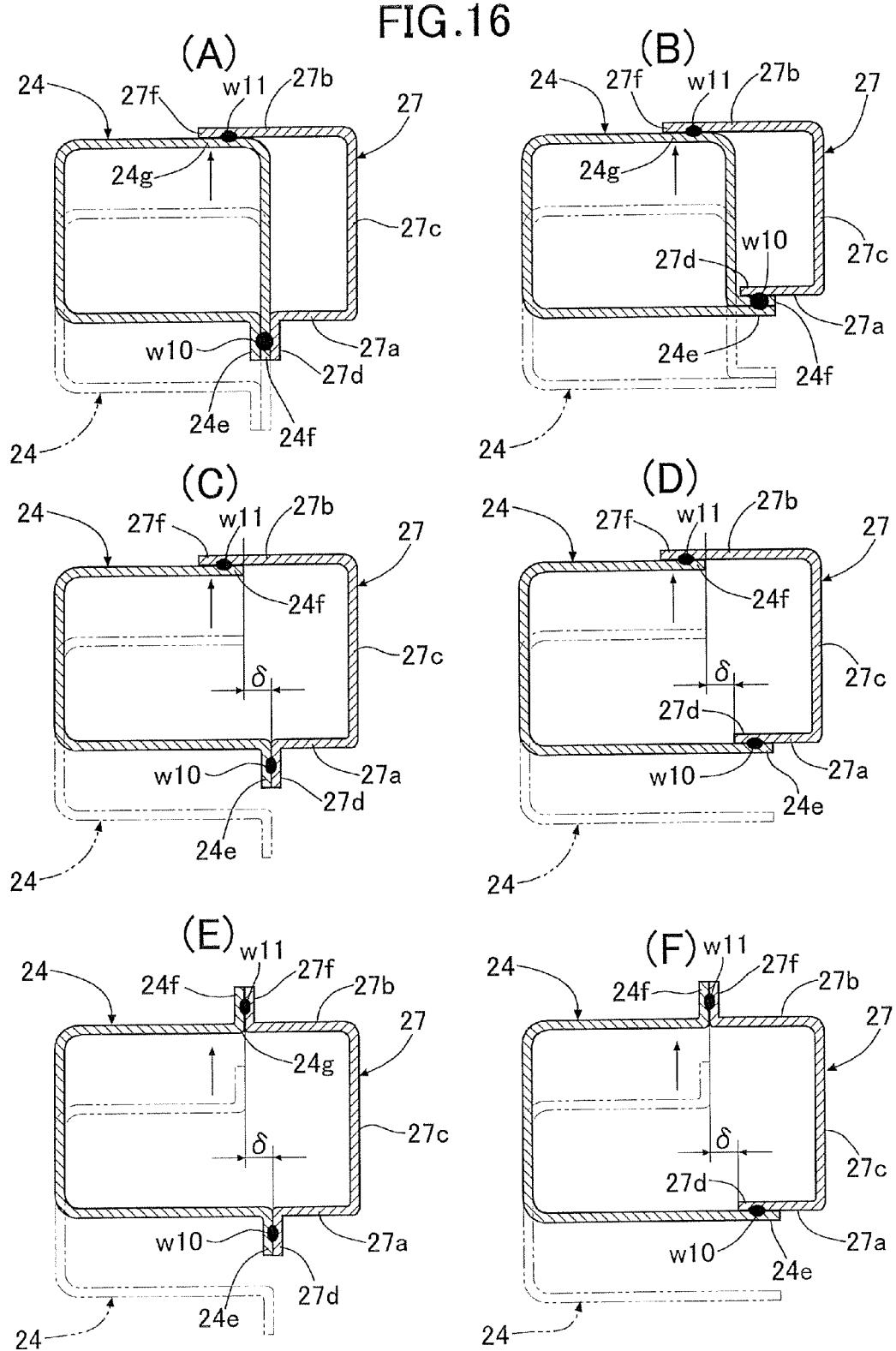
FIG. 16 is a view showing another embodiment of a bulkhead side. (tenth to fifteenth embodiments)

In the tenth embodiment shown in FIG. 16 (A), a bulkhead side 24 is formed from a pressed material having a rectangular closed cross-section, and the closed cross-section is formed by joining two joining flanges 24e and 24f disposed within a plane B by a weld w10. A joining flange 27d extending within the plane B of a front wall portion 27a of a reinforcing member 27 and the two joining flanges 24e and 24f are superimposed as three layers and joined by the weld w10, and a joining flange 27f extending within the plane T of a rear wall portion 27b is joined to a rear face 24g of the bulkhead side 24 by a weld w11.

The eleventh embodiment shown in FIG. 16 (B) is a modification of the tenth embodiment shown in FIG. 16 (A); two joining flanges 24e and 24f of a bulkhead side 24 are disposed within a plane T and are joined by a weld w10 together with a joining flange 27d of a reinforcing member 27 similarly disposed within the plane T as three layers.

In the twelfth embodiment shown in FIG. 16 (C), a bulkhead side 24 is formed so as to have a squared U-shaped open cross-section opening outwardly in the vehicle width direction. A joining flange 24e of the bulkhead side 24 and a joining flange 27d of a reinforcing member 27 are joined by a weld w10 within a plane B, and a joining flange 24f of the bulkhead side 24 and a joining flange 27f of the reinforcing member 27 are joined by a weld w11 within a plane T.

The thirteenth embodiment shown in FIG. 16 (D) is a modification of the twelfth embodiment shown in FIG. 16

(C); a joining flange 24e of a bulkhead side 24 and a joining flange 27d of a reinforcing member 27 are joined by a weld w10 within a plane T.

The fourteenth embodiment shown in FIG. 16 (E) is a modification of the twelfth embodiment shown in FIG. 16 (C); a joining flange 24f of a bulkhead side 24 and a joining flange 27f of a reinforcing member 27 are joined by a weld w11 within a plane B.

The fifteenth embodiment shown in FIG. 16 (F) is a modification of the thirteenth embodiment shown in FIG. 16 (D); a joining flange 24f of a bulkhead side 24 and a joining flange 27f of a reinforcing member 27 are joined by a weld w11 within a plane B.

In the twelfth to fifteenth embodiments, the bulkhead side 24 is a member having an open cross-section and forms a closed cross-section by being joined to the reinforcing member 27 similarly having an open cross-section, thus ensuring that there is a necessary strength. Furthermore, since the joining flange 24f on the rear side of the bulkhead side 24 is offset inwardly in the vehicle width direction with respect to the joining flange 27d on the front side of the reinforcing member 27 only by a distance δ, it is possible to avoid interference with the joining flange 27d on the front side of the reinforcing member 27 when assembling the bulkhead side 24 on a front side frame 11 from the front side.

Embodiments of the present invention are explained above, but the present invention may be modified in a variety of ways as long as the modifications do not depart from the spirit and scope thereof.

For example, the shape of the linking panel 26 is not limited to the right-angled triangle shape of the embodiments, and any shape may be employed.

Moreover, the vertical member of the present invention is not limited to the bulkhead side 24 or the subframe support bracket 32 of the embodiments.

Furthermore, in the embodiments the linking panel 26 is joined to the rear face of the bulkhead side 24, but it may be joined to the front face.

Moreover, in the embodiments the reinforcing member 27 is provided on the upper part of the front side frame 11 or on both the upper part and the lower part, but the reinforcing member 27 may be provided only on the lower part of the front side frame 11.

Furthermore, in the embodiments the bulkhead side 24 is formed from one member but it may be formed by joining two members.

Moreover, in the embodiments the bulkhead upper 22 and the corner members 25 and 25 of the front bulkhead 21 are formed from separate members, but they may be formed integrally from one member. Similarly, in the embodiments the bulkhead side 24 and the corner members 25 and 25 of the front bulkhead 21 are formed from separate members, but they may be formed integrally from one member.

Furthermore, in the embodiments the bulkhead upper 22 is formed from a pipe material having a rectangular cross-section, but it may be formed from a pipe material having another cross-sectional shape or from a pressed component.

Moreover, in the embodiments the linking panel 26 and the reinforcing plate 28 are formed from separate members, but they may be formed integrally from one member.

Furthermore, in the embodiments the bulkhead side 24 may be formed from one member, but it may be formed by joining two members.

Moreover, the front wall portion 27a of the reinforcing member 27 may be connected to either the front face or the outer face in the vehicle width direction of the bulkhead side 24, and the rear wall portion 27b of the reinforcing member 27 may be connected to either the rear face or the outer face in the vehicle width direction of the bulkhead side 24.

Moreover, in the embodiments the bulkhead upper 22 is formed from a pipe material having a rectangular cross-section, but it may be formed from a pipe material having another cross-sectional shape or from a pressed component.

The invention claimed is:

1. A structure for a front portion of an automobile body, comprising
   a front side frame that extends in a fore-and-aft direction,
   a bulkhead side member that is joined to a front portion of the front side frame and extends in a substantially vertical direction,
   a wheel house upper member that extends downwardly and toward the front from a front end of a front pillar outside the front side frame in the vehicle width direction,
   a side frame gusset that provides a connection between a front portion of the front side frame and a front portion of the wheel house upper member, and
   a linking panel that joins the bulkhead side member and the side frame gusset within a plane T,
   wherein the linking panel comprises a member having a substantially right-angled triangle shape when viewed from the front and comprises a horizontal edge portion, a vertical edge portion and an inclined edge portion, the vertical edge portion being joined to the bulkhead side member beneath the front side frame within the plane T, and the horizontal edge portion being joined to the side frame gusset within the plane T.

2. The structure for a front portion of an automobile body according to claim 1, wherein the linking panel is joined to the front portion of the wheel house upper member within the plane T at an apex where the horizontal edge portion and the inclined edge portion are merged together.

3. The structure for a front portion of an automobile body according to claim 1, wherein the horizontal edge portion of the linking panel is formed integrally with a front face of the side frame gusset.

4. The structure for a front portion of an automobile body according to claim 1, wherein the vertical edge portion of the linking panel is formed integrally with a front face or a rear face of the bulkhead side member.

5. The structure for a front portion of an automobile body according to claim 1, wherein a front bulkhead, that is formed into a substantially rectangular shape while comprising a bulkhead upper extending in the vehicle width direction, a bulkhead lower extending in the vehicle width direction, and a left and right pair of the bulkhead side members extending in the vertical direction, is supported between front portions of a pair of left and right front side frames,
   and wherein a pair of left and right corner members linking the bulkhead upper and the bulkhead side member are formed integrally from a bent hollow steel tube, the bulkhead side member is molded by hydroforming or press forming so as to form a recess in an outer face in the vehicle width direction, and an inner face in the vehicle width direction of the front side frame is joined to the recess.

6. The structure for a front portion of an automobile body according to claim 5, wherein the outer face in the vehicle width direction of the bulkhead side member and an upper face or a lower face of the front side frame are linked via a reinforcing member.

7. The structure for a front portion of an automobile body according to claim 6, wherein the reinforcing member is formed so as to have a squared U-shaped cross-section while comprising a front wall portion, a side wall portion and a rear wall portion, the rear wall portion jutting out further inward in the vehicle width direction than the front wall portion.

8. The structure for a front portion of an automobile body according to claim 5, wherein the bulkhead side member and the bulkhead lower are linked via a first reinforcing plate disposed on the same plane as the linking panel.

9. The structure for a front portion of an automobile body according to claim 5, wherein the corner member is reinforced by a second reinforcing plate.

10. The structure for a front portion of an automobile body according to claim 1, wherein a front bulkhead formed into a frame shape is disposed between front portions of a pair of left and right front side frames, the front bulkhead is fixed to the front side frame via a reinforcing member, and wherein the reinforcing member comprises a side wall portion that provides a connection as a continuous face between an outer face in the vehicle width direction of the front bulkhead and an outer face in the vehicle width direction of the front side frame.

11. The structure for a front portion of an automobile body according to claim 10, wherein the reinforcing member further comprises a front wall portion that extends from the front edge of the side wall portion inwardly in the vehicle width direction and is connected to a front face or the outer face in the vehicle width direction of the front bulkhead, and a rear wall portion that extends from the rear edge of the side wall portion inwardly in the vehicle width direction and is connected to a rear face or an outer face in the vehicle width direction of the front bulkhead, and is formed into a squared U-shape with the horizontal cross-section opening inwardly in the vehicle width direction.

12. The structure for a front portion of an automobile body according to claim 11, wherein the rear wall portion juts out further inward in the vehicle width direction than the front wall portion.

13. The structure for a front portion of an automobile body according to claim 10, wherein the reinforcing member is provided on both an upper side and a lower side of the front side frame.

14. The structure for a front portion of an automobile body according to claim 10, wherein the front bulkhead comprises a bulkhead upper that extends in the vehicle width direction, a left and right pair of the bulkhead side members that extend in the vertical direction, and a pair of left and right curved corner members that provide a connection between the bulkhead upper and the bulkhead side member, the bulkhead upper and the corner member being formed so as to have a closed cross-section, and the bulkhead side member being formed so as to have a closed cross-section or an open cross-section and, when the bulkhead side member is formed so as to have an open cross-section, being joined to the front side frame or the reinforcing member so as to form a closed cross-section.

15. The structure for a front portion of an automobile body according to claim 2, wherein the horizontal edge portion of the linking panel is formed integrally with a front face of the side frame gusset.

16. The structure for a front portion of an automobile body according to claim 2, wherein the vertical edge portion of the linking panel is formed integrally with a front face or a rear face of the bulkhead side member.

17. The structure for a front portion of an automobile body according to claim 6, wherein the bulkhead side member and the bulkhead lower are linked via a first reinforcing plate disposed on the same plane as the linking panel.

18. The structure for a front portion of an automobile body according to claim 7, wherein the bulkhead side member and the bulkhead lower are linked via a first reinforcing plate disposed on the same plane as the linking panel.

19. The structure for a front portion of an automobile body according to claim 6, wherein the corner member is reinforced by a second reinforcing plate.

20. The structure for a front portion of an automobile body according to claim 7, wherein the corner member is reinforced by a second reinforcing plate.

21. The structure for a front portion of an automobile body according to claim 11, wherein the reinforcing member is provided on both an upper side and a lower side of the front side frame.

22. The structure for a front portion of an automobile body according to claim 12, wherein the reinforcing member is provided on both an upper side and a lower side of the front side frame.

23. The structure for a front portion of an automobile body according to claim 11, wherein the front bulkhead comprises a bulkhead upper that extends in the vehicle width direction, a left and right pair of the bulkhead side members that extend in the vertical direction, and a pair of left and right curved corner members that provide a connection between the bulkhead upper and the bulkhead side member, the bulkhead upper and the corner member being formed so as to have a closed cross-section, and the bulkhead side member being formed so as to have a closed cross-section or an open cross-section and, when the bulkhead side member is formed so as to have an open cross-section, being joined to the front side frame or the reinforcing member so as to form a closed cross-section.

24. The structure for a front portion of an automobile body according to claim 12, wherein the front bulkhead comprises a bulkhead upper that extends in the vehicle width direction, a left and right pair of the bulkhead side members that extend in the vertical direction, and a pair of left and right curved corner members that provide a connection between the bulkhead upper and the bulkhead side member, the bulkhead upper and the corner member being formed so as to have a closed cross-section, and the bulkhead side member being formed so as to have a closed cross-section or an open cross-section and, when the bulkhead side member is formed so as to have an open cross-section, being joined to the front side frame or the reinforcing member so as to form a closed cross-section.

* * * * *